United States Patent [19]
Kondo

[11] Patent Number: 5,265,197
[45] Date of Patent: Nov. 23, 1993

[54] GEOMETRIC MODELING APPARATUS

[75] Inventor: Koichi Kondo, Yokohama, Japan

[73] Assignee: Kabushiki Kaisha Toshiba, Kawasaki, Japan

[21] Appl. No.: 454,628

[22] Filed: Dec. 21, 1989

[30] Foreign Application Priority Data

Dec. 23, 1988 [JP] Japan ................................ 63-323402
Oct. 26, 1989 [JP] Japan ................................ 1-277014

[51] Int. Cl.⁵ ...................... G06F 15/60; G06F 15/62
[52] U.S. Cl. .................................... 395/120; 395/141; 395/161; 364/474.24; 364/474.23; 364/192
[58] Field of Search .................... 395/120, 141, 161; 364/474.22, 474.24, 474.23, 192, 191, 188

[56] References Cited

U.S. PATENT DOCUMENTS

| | | | |
|---|---|---|---|
| 4,882,692 | 11/1989 | Saxton et al. | 395/141 X |
| 4,933,865 | 6/1990 | Yamamoto et al. | 364/474.24 X |
| 4,951,227 | 8/1990 | Todd | 395/141 X |
| 5,070,534 | 12/1991 | Lascelles et al. | 395/141 X |
| 5,159,664 | 10/1992 | Yamamoto et al. | 395/141 X |

FOREIGN PATENT DOCUMENTS 0361787  4/1990  European Pat. Off. .
8605610  9/1986  PCT Int'l Appl. .

OTHER PUBLICATIONS

"HP-Design" (HP 98355A), Technical Description, Hewlett-Packard, Nov. 1984.
Kawagoe et al., "Parametric Object Model: A Geometric Data Model for Computer-Aided-Engineering", NEC Research and Development, Jan. 1984, pp. 23-32.
"Modification of Geometric Models Through Variational Geometry", Robert Light and David Gossard, Comput.-Aided Des. vol. 14, No. 4, 1982, pp. 209-214.
"Variation of Geometries based on a Geometric-Reasoning Method", B. Idefeld, Comput.-Aided Des. vol. 20, No. 3, Apr. 1988, pp. 117-126.
"Interaction Management In CAD Systems With History Mechanism", Yasushi Yamaguchi, Fumihiko Kimura, Paul J. W. ten Hagen, Eurographics'87, 1987, pp. 543-554.

Primary Examiner—Gary V. Harkcom
Assistant Examiner—Raymond J. Bayerl
Attorney, Agent, or Firm—Oblon, Spivak, McClelland, Maier & Neustadt

[57] ABSTRACT

A two- or three-dimensional geometric modeling apparatus in which a two- or three-dimensional shape is input to a processing unit via an input unit to form a shape, the formed shape is extracted from the processing unit and displayed on a display unit, data for changing is input to the processing unit from the input unit in order to change the displayed shape or scale, and the shape or scale is changed on the basis of predetermined stored information, thereby displaying the changed shape or scale on the display unit. The predetermined stored information is stored as a history such that a plot method and plot contents of each of plot operations executed upon formation of the shape and an order of the plot operations correspond to a geometric constraint for defining the shape to be formed. When a portion to be changed of the shape or scale is specified, the history is referred to search a plot operation forming the specified portion to be changed. Instead of inputting adding information for this changing, the searched plot operation is executed in accordance with the data to be changed to execute changing (cancelling, adding, and correction) of the shape or scale.

6 Claims, 25 Drawing Sheets

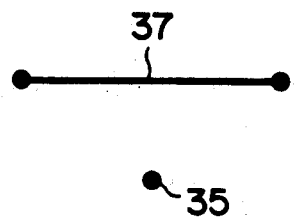
F I G. 11A
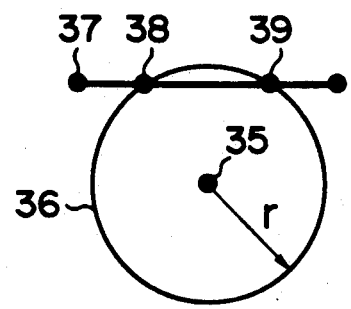
F I G. 11B
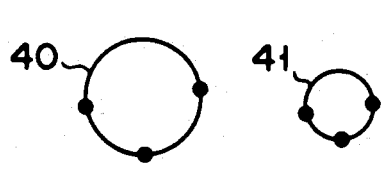
F I G. 12A
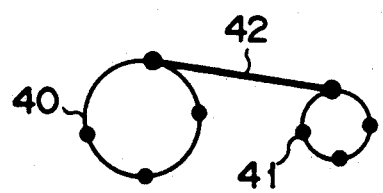
F I G. 12B
F I G. 13A
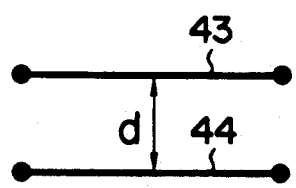
F I G. 13B
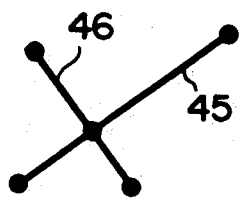
F I G. 14A
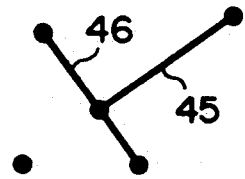
F I G. 14B $f_1: x_1 = 0$
$f_2: y_1 = 0$
$f_3: y_3 - y_1 = 0$
$f_4: y_2 - y_1 - d_1 = 0$
$f_5: (x_3 - x_2)^2 + (y_3 - y_2)^2 - d_3^2 = 0$
$f_6: x_3 - x_1 - d_2 = 0$

GEOMETRIC MODELING APPARATUS

BACKGROUND OF THE INVENTION

1. Field of the Invention

The present invention relates to a geometric modeling method and an apparatus therefor capable of inputting a two-or three-dimensional shape in a computer or the like to form a shape and a scale, and performing changing (cancelling, adding, and correction) of the shape or scale.

2. Description of the Related Art

The following literatures can be referred to as materials describing relevant techniques in detail.

(1) Y. Yamaguchi, F. Kimura & P. J. W. ten Hagen, "INTERACTION MANAGEMENT IN CAD SYSTEMS WITH HISTORY MECHANISM" EUROGRAPHICS '87, 1987.

(2) R. Light & D. Gossard, "Modification of geometric models through variational geometry", Computer-Aided Design, Vol. 14, No. 4, July 1982.

(3) B. Aldefeld, "Variation of geometries based on a geometric-reasoning", Computer-Aided Design, Vol. 20, No. 3, April 1988.

Conventionally, geometric models such as a wireframe model, a surface model, and a solid model are used to input a two- or three-dimensional shape in a computer or the like. The wireframe model is a method of expressing a shape only by edges like a wirework. The surface model is a method of expressing a three-dimensional shape as an aggregation of its faces. The solid model is a method of expressing a three-dimensional shape including a difference between the interior and exterior of a solid into a computer. More specifically, in a known method of expressing a three-dimensional shape, faces and a relation between the faces are expressed by a relation between edges and faces and a relation between edges and points, thereby expressing how the faces are connected to form the surface of the solid (by, e.g., using an equation representing a predetermined shape or performing point-and-vector (normal vector) display), and describing which side of each face is inside the solid.

These methods, however, aim at correctly expressing the shape of a solid in a computer. That is, a computer stores only the final shape of an input shape. Therefore, in order to correct the shape, a new shape must be formed, or the type of changing must be specified for all of shape elements such as a face, an edge, and a point to be changed upon correction. For example, even if there is only one portion to be corrected, a large number of portions must be corrected upon correction of the one portion. That is, since all the portions must be corrected in order to achieve perfect correction, a correction operation becomes very cumbersome.

In order to solve the above problem, a method has been proposed in which relations between faces o edges of a solid or equations to be satisfied are independently defined (e.g., a relation between coordinates and a distance in a space is defined as an equation, or a parallel or perpendicular relation between faces or edges is defined), and the shape is deformed on the basis of this information. In these methods, however, since additional information must be added (after shape formation) to a geometric model formed beforehand, an operation of forming the adding information becomes cumbersome. For example, in the case of a triangle as shown in FIG. 35, conditions to be satisfied by this shape are six simultaneous equations f1 to f6 shown on the left side of FIG. 35. In this case, even if one of the equations is not satisfied or another condition is added, the solution cannot be obtained. That is, a shape cannot be uniquely determined unless adding information is formed without any addition or omission.

As described above, it is difficult to cope with changing of a shape by only a geometric model. In addition, in order to realize shape changing, adding information must be independently added without any addition or omission. It is very difficult to independently define adequate adding information without any addition or omission for a corresponding partial shape such as a circle, a line segment, or a vertex of interest of a general complicated shape. In addition, since adding information must be independently formed for each partial shape, this conventional method has no sufficient versatility and therefore is not practical.

SUMMARY OF THE INVENTION

It is an object of the present invention to provide a modeling method capable of performing changing (cancelling, adding, and correction) of a scale and a shape without additionally inputting adding information for shape changing, and an apparatus for realizing the same.

According to the present invention, there is provided a geometric modeling method in which a two- or three-dimension a shape is input to a processing unit via an input section to form the shape, the shape is read out from the processing unit and displayed on the graphic display, data for changing is input from the input section to the processing unit to change the displayed shape or scale, the shape or scale is changed on the basis of predetermined stored information, and the changed shape or scale is displayed on the graphic display, wherein the predetermined stored information is stored so that plot operations executed upon formation of the shape correspond to a geometric constraint for defining the shape to be formed. In addition, when a portion of the shape and the scale to be changed is specified, the shape input history is referred to search one of the plot operations forming the specified portion to be changed, and the searched plot operation is executed in accordance with data to be changed to change the shape and the scale.

In addition, according to the present invention, there are provided a geometric modeling method and an apparatus therefor comprising:

an input section for inputting a command or data for forming a two- or three-dimensional shape or changing the formed shape or scale;

a processing unit for executing plot operations to form the shape or change the formed shape and scale on the basis of the command or data; and a graphic display for displaying the shape formed by the processing unit, wherein the processing unit comprises:

a shape drawing operation section capable of receiving the shape and the size to execute plot operations for forming the shape or changing and forming the shape, and executing a reverse operation of the plot operation if necessary;

a history memory for storing a plot method or plotted contents of each of the plot operations executed when a shape is input to form a new shape and an operation order of the plot operations as a history;

a shape memory for storing a shape formed by each plot operation; and a data-base or file-searcher for, when a portion of the shape and the scale to be changed is specified, referring to the stored contents in the history memory, and searching one of the plot operations forming the specified portion to be changed, wherein plotting is executed by the plot operation searched by the data-base or file-searcher on the basis of data to be changed, thereby changing the shape and the scale.

That is, the input section, the history memory, the shape memory, the data-base or file-searcher, the graphic display, and the like are hardware or graphic process firmware constituting a computer main body and its peripheral devices.

Software, constituted by control programs of the shape drawing operation section and the like for performing a series of graphic processes as the features of the present invention and control programs for forming relating information, for realizing the method of the present invention, is operated in the computer main body.

According to the shape modeling method and the shape modeling apparatus having the above arrangement, an operator inputs a desired plot method or plot contents and an order of each plot operation as a history in a plot process. Therefore, when a portion to be changed such as an angle or scale of a graphic pattern is specified, the history is referred to search a plot operation corresponding to the specified portion to be changed, only the plot operation corresponding to the portion to be changed is executed in accordance with the new changing contents, and other plot operations are executed again on the basis of the contents of the history, thereby automatically drawing up the changed shape in the changed scale.

According to the present invention as described above, additional information need not be added to a shape model after a shape is input, and a history is stored. Therefore, since the shape and the scale of any shape can be efficiently changed, versatile changing of a shape and a scale can be executed.

BRIEF DESCRIPTION OF THE DRAWINGS

FIGS. 8A to 14B are views showing examples of plot operations which can be used in the present invention;

DETAILED DESCRIPTION OF THE PREFERRED EMBODIMENT

An embodiment of the present invention will be described below with reference to the accompanying drawings.

Figure 1:
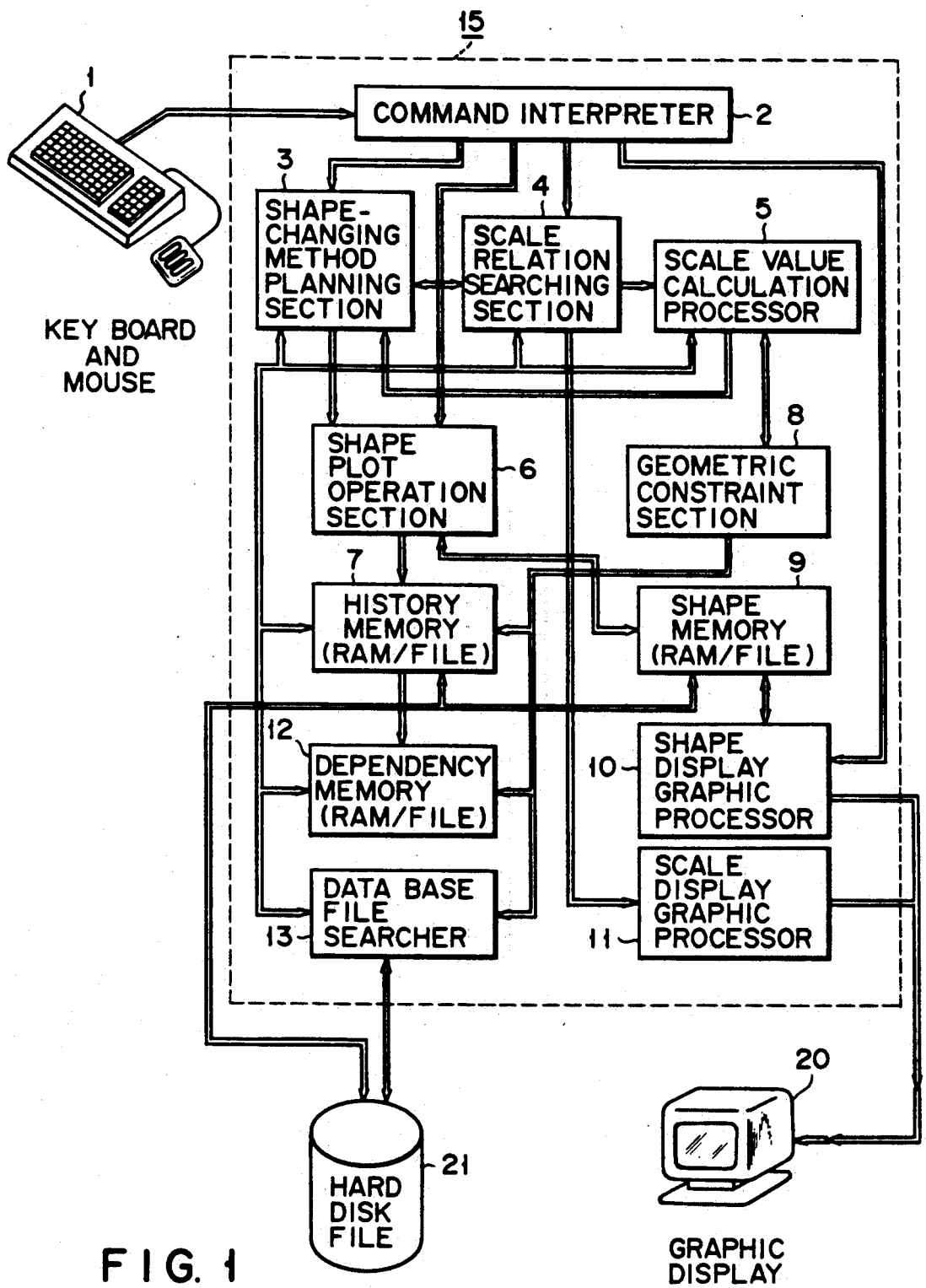
FIG. 1 is a block diagram showing a schematic arrangement of a shape modeling apparatus of the present invention

FIG. 1 is a functional block diagram showing a schematic basic arrangement of an inputting/changing apparatus (geometric modeling apparatus) for a shape and a scale according to the embodiment of the present invention. As shown in FIG. 1, this apparatus comprises the following functional blocks.

That is, a command interpreter 2, a shape changing method planning section 3, a scale relation searching section 4, a scale value calculation processor 5, a shape drawing operation section 6, a history memory 7, a geometric constraint section 8, a shape memory 9, a shape graphic processor 10, a scale display graphic processor 11, a dependency memory 12, a data-base or file-searcher 13, and the like are provided as hardware or software in a processing unit 15 for constituting a computer such as a versatile computer or a personal computer together with an input section 1, a graphic display section 20, and an external file 21.

The input section 1 is constituted by a key-board and a mouse having a pick-up function. The key-board inputs a command or a scale value via a key-board. The mouse performs pick-up of a predetermined command and a scale value.

The command interpreter 2 is a kind of a command interpreter for receiving a command string input by an operator from the input section 1, and for checking syntax of the command and the command parameters. That is, this interpreter first checks whether a command string "XXX, nn, mm, . . . " is a scale changing command or a shape operation command, i.e., whether the command string coincides with a syntax rule. If the command string is a correct syntax, the command and accessory parameters are analyzed in detail, and a device or a control program (subroutine) of a corresponding functional block is activated. That is, the interpreter is constituted by a command interpreter (firm software) having the above function.

The shape changing method planning section 3 is constituted by software. When a scale changing command is selected, the section 3 checks, on the basis of arbitrary conditions, whether plotting is replotted from the beginning or plotting is returned backward to a portion to be corrected and then performed again in shape changing performed upon scale changing (the criterion of this determination will be described in detail later). In addition, when a scale to be changed is specified, the section 3 specifies a shape element related to the scale. The section 3 searches related data in the scale relation searching section 4, the history memory 7, the dependency memory 12, and the like (to be described below) and refers to a shape element which will be affected when the specified shape element is changed in accordance with the scale change.

The scale relation searching section 4 is constituted by software. When a command such as scale display, scale cancelling, or scale adding is selected, the section 4 specifies a shape element related to the specified scale. If necessary, the section 4 searches the history memory 7 and the dependency memory 12, or the data-base or file-searcher 13, and refers to a shape element affected by the specified shape element. When a scale adding command is selected, the scale value calculation processor 5 constituted by an arithmetic processor for calculating coordinate data and the like calculates a preliminary scale for obtaining a scale to be added. A method (basically a mathematical method) of calculating the preliminary scale is determined and executed by the geometric constraint section 8 (to be described in detail later).

The shape drawing operation section 6 is defined as graphic function (library) groups consisting of software (to be described in detail later) for changing a shape stored in the shape memory 9 (to be described later) or forming a new shape. These function groups are executed by a CPU, and a corresponding graphic pattern is plotted and displayed via a graphic processor.

The history memory 7 is constituted by an internal memory such as a RAM for sequentially storing input shape data and an external file, if necessary. The memory 7 stores an input history such as contents, an order, and the like of shape data when an operator plots a shape.

The shape memory 9 is constituted by an internal memory such as a RAM for shape data or an external file for software programs, if necessary. The memory 9 stores data of a shape formed by combining various plot operations of the shape drawing operation section 6.

Each of the shape and scale display graphic processors 10 and 11 is constituted by a graphic processor or the like in a computer and can display a shape or scale on the graphic display section 20 such as a graphic display.

Figure 2:
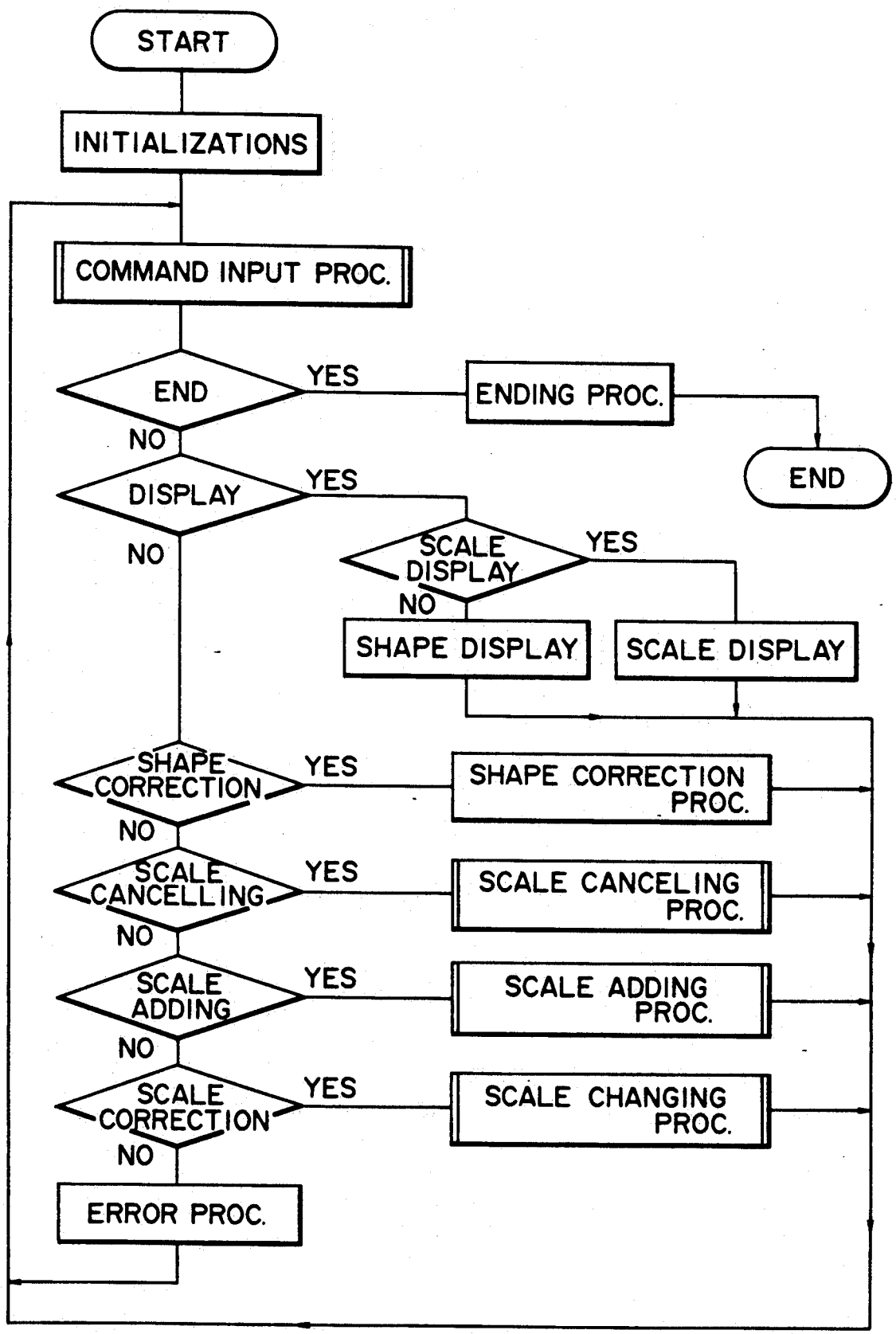
FIG. 2 is a schematic flowchart for explaining a shape modeling method according to input/changing of a shape and a scale of the present invention.
Figure 3:
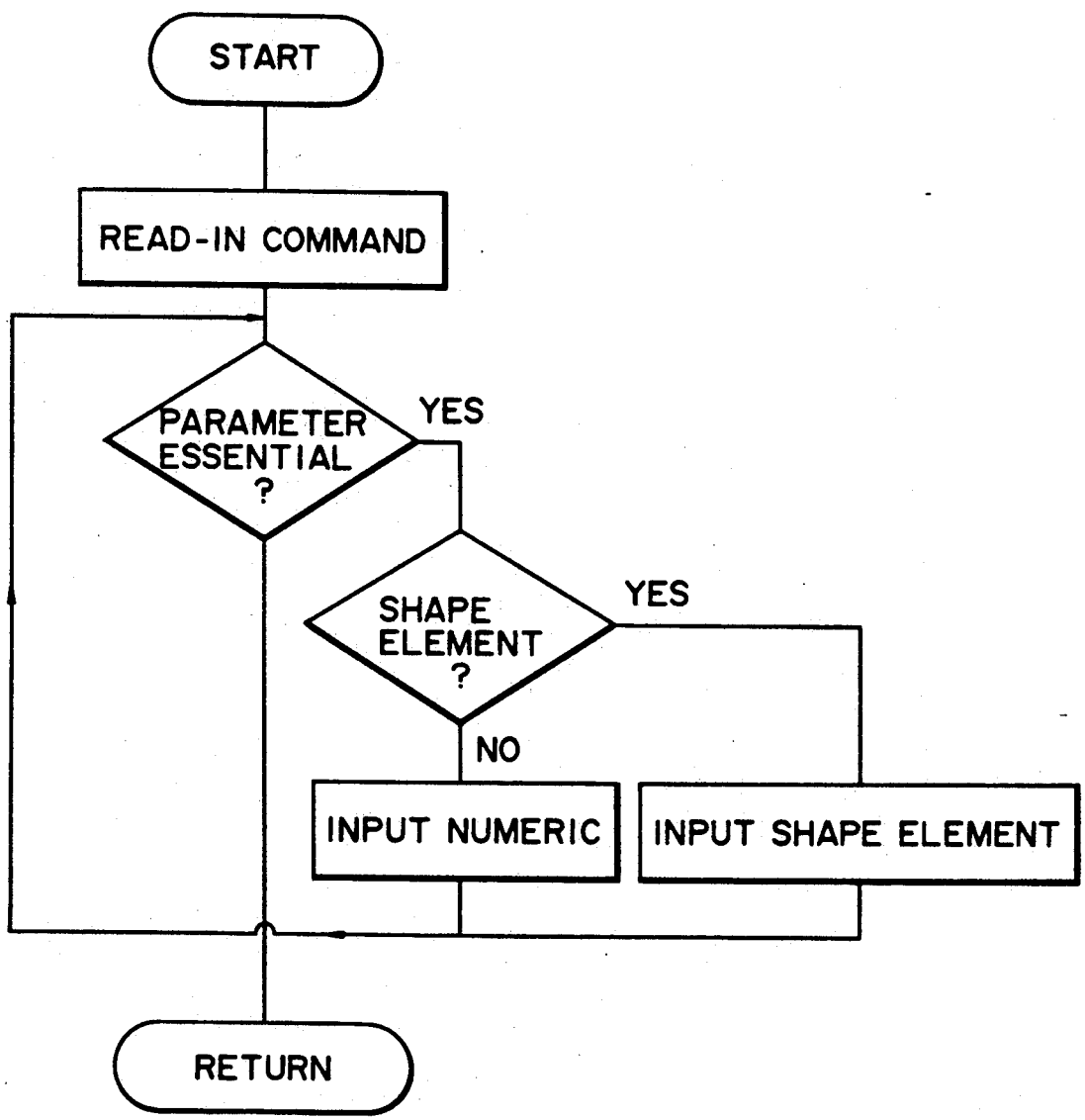
FIG. 3 is a flowchart for explaining a read-in command process according to input of the present invention.

FIG. 2 is a schematic flowchart for explaining the shape and scale inputting/changing method (geometric modeling method) according to the present invention. FIGS. 3 to 6 are a read-in command process flowchart, a scale cancel process flowchart, a scale correction process flowchart, and a scale adding process flowchart, respectively. Operations according to shape inputting/changing and scale inputting/changing (cancelling, correction, and adding) of the present invention will be briefly described below with reference to FIGS. 1 to 6.

A command input from the input section 1 is interpreted by the command interpreter 2 to determine whether it is a shape process (shape operation) command for forming a one-, two-, or three-dimensional shape, a shape display command for displaying a formed shape on the graphic display 20, a scale display command for displaying the scale of a formed shape on the graphic display 20, a scale correction command for changing a displayed scale to correct a shape, a scale adding command for specifying two points and specifying a new scale relation between them, or a scale cancelling command. Note that the type of a command is not limited to those enumerated above.

The type and contents of a command as one of the features of the present invention will be briefly described below.

(A) Shape Drawing Operation (Plot Operation) Command

When a shape operation (plot operation) command is selected and a parameter for shape input is input from the input section 1, the shape operation section 6 is activated to execute shape formation, i.e., a plot operation. At this time, a history for a shape process indicating the plot contents and the plot order of the shape is stored in the history memory 7. In actual plotting, this process is repeatedly executed to sequentially form a complicated shape.

The input data is stored in the shape memory 9 each time and at the same time can be displayed together with a shape formed in accordance with an input order of the data on the graphic display 20. A complete shape for which the shape operation is finished can also be naturally displayed.

(B) Scale Cancel Command

Figure 4:
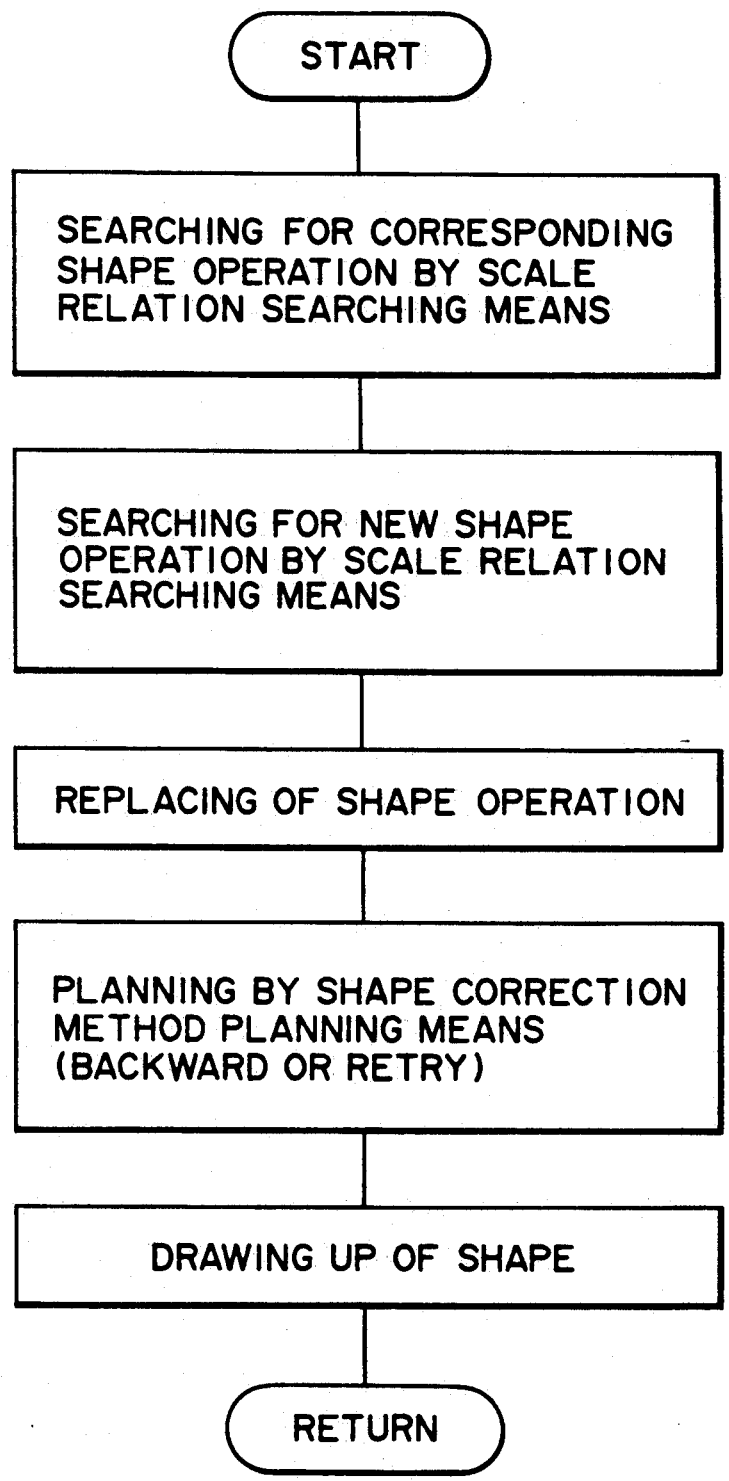
FIG. 4 is a flowchart for explaining a scale cancel process according to a changing function of the present invention.

FIG. 4 shows a scale cancel process flowchart.

In this embodiment, scale cancelling is defined to not merely erase a scale display on the graphic display but to cancel a scale relation (scale dependent relation) present between shape operations.

This scale cancelling is theoretically achieved by replacing, in each shape operation having a scale relation, a corresponding shape operation by another equivalent shape operation (the same topological operation) not defining a scale relation. More specifically, in many cases, by performing the shape operation on the basis of absolute coordinates, a scale dependent relation with respect to another shape operation disappears, and scale cancelling is realized.

When the scale cancel command is selected, two vertexes having a scale, for example, are picked up from a shape displayed on the graphic display 20 by the mouse or the like of the input section 1. The scale relation searching section 4 is activated to search a shape element related to scale cancelling, e.g., a plot operation according to drawing up of the picked-up vertexes. In order to replace the searched plot operation by a scale relation, the section 4 searches another equivalent shape operation not having a defined scale relation, and replaces the above shape operation by this new shape operation.

This scale cancelling is also utilized when scale adding (to be described later) is to be performed and scale cancelling is required for over-dimensioning (in which no new scale can be added unless an existing scale is cancelled as will be described later).

(C) Scale Correction (Shape Correction) Command

Figure 5:
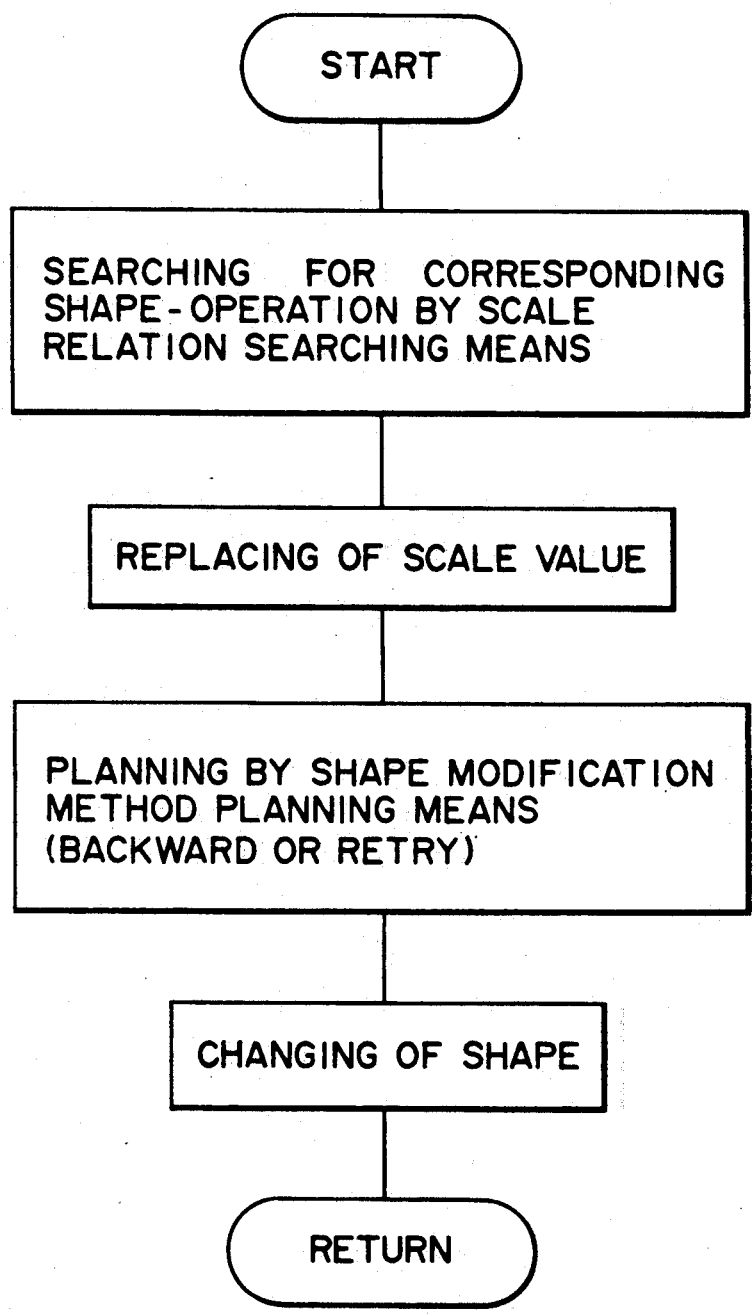
FIG. 5 is a flowchart for explaining a scale correction process according to the changing function of the present invention.

FIG. 5 is a flowchart for explaining a scale correction process.

Basically, when a scale correction command is executed, a scale is replaced by a new scale, and a shape is automatically corrected in correspondence with the new scale.

When the scale correction command is selected, a displayed scale portion to be corrected is picked up and selected by the mouse or the like of the input section 1, and a new scale after correction is input by the keyboard or the like. Upon pick-up of the scale to be corrected, the shape changing method planning section 3 is activated, and the scale relation searching section 4 is operated accordingly. The section 4 refers to the contents of the history memory 7 or the dependency memory 12, and searches and specifies a plot operation corresponding to the scale to be corrected. That is, the scale relation searching section searches a plot operation corresponding to the scale to be corrected and specifies the searched plot operation.

The shape changing method planning section 3 checks whether plotting is to be returned backward to an immediately preceding plot operation of the specified plot operation or is to be retried from the beginning, i.e., checks which method is simpler. This determination will be described in detail later.

After plotting is returned backward to the immediately preceding plot operation of the specified plot operation or is retried from the beginning on the basis of the above determination, plotting is executed by using the new scale after correction. If this correction has no influence on another shape, i.e., has no dependency with another, plotting after the correction is performed such that the stored contents are executed again (copied) by using the shape drawing operation section 6 in accordance with the history memory 7, thereby reproducing the shape to be obtained. If a dependency is found by searching for referring to the contents of the dependency memory 12, the shape operation having the dependency is executed again to form the shape to be obtained.

In order to specify a plot operation to be corrected by the scale relation searching section 4, if a correspondence between a plot operation and a scale is formed like a correspondence table upon input as the memory contents of the history memory, or if the section 4 is activated, an optimal changing method can be obtained by searching the correspondence between the plot operation and the scale.

(D) Scale Adding Command

Figure 6:
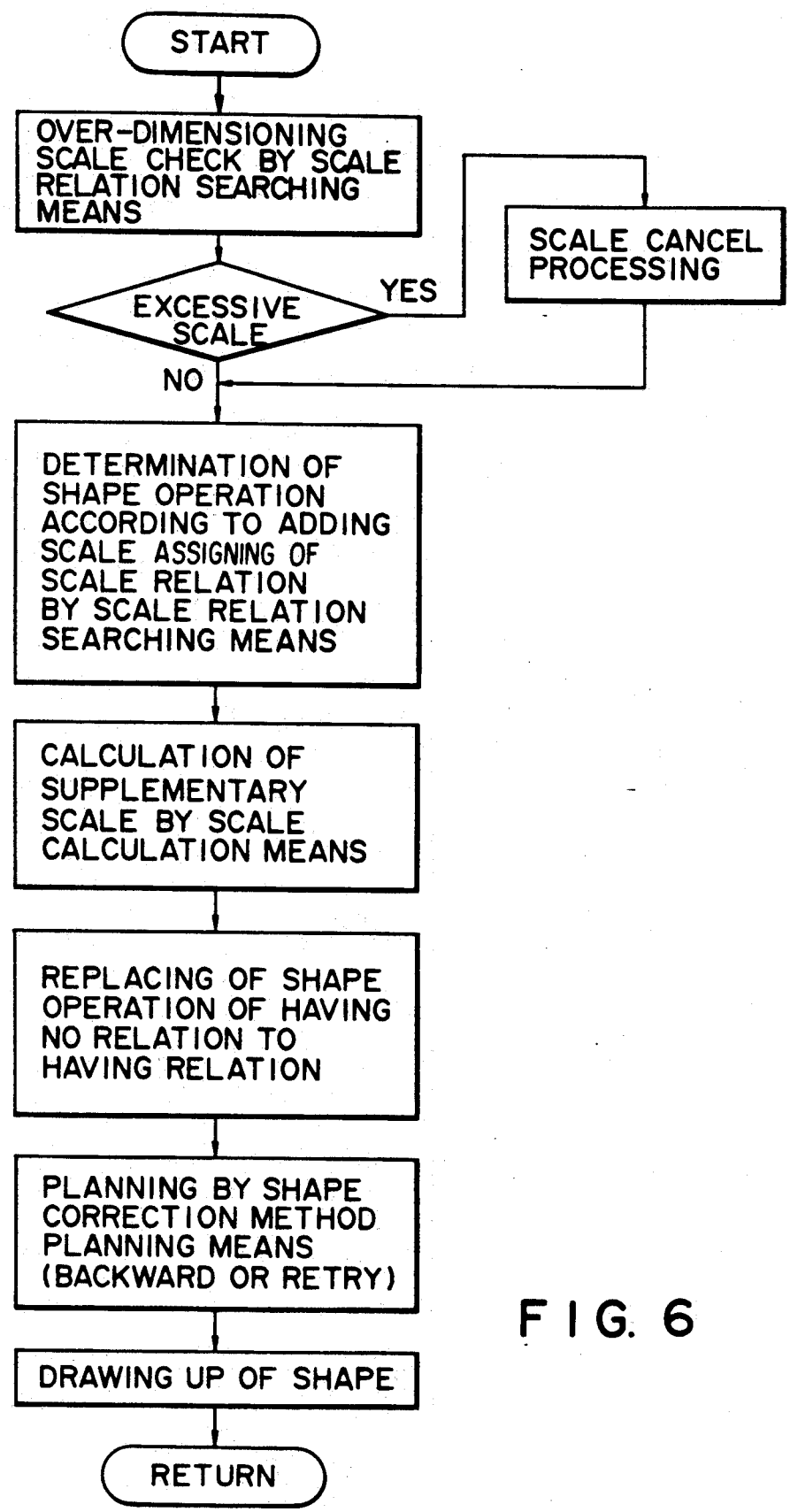
FIG. 6 is a flowchart for explaining a scale adding process according to the changing function of the present invention.

According to a scale adding process flowchart shown in FIG. 6, an operator selects a scale adding command, picks up, for example, two vertexes having a scale relation to be defined from a shape displayed on the graphic display 20 by the mouse or the like of the input section 1 to select a shape element related to scale adding, and inputs a scale value to be added from the key-board or the like.

In scale adding, the scale relation searching section 4 checks over-dimensioning (in which, when a new scale is to be defined, only one shape having an existing scale relation is defined, and the new scale cannot be added unless the existing scale is cancelled (cancelling of the scale relation)). This over-dimensioning check will be described in detail later. If over-dimensioning is not determined or over-dimensioning is determined and at least one scale is cancelled, the following process is executed.

That is, upon activation, the section 4 searches a shape element related to scale adding, e.g., a plot operation according to drawing up of vertexes picked up by an operator. In addition, the section 4 refers to the contents of the history memory 7 and the dependency memory 12 and searches a plot operation having an influence on the new changing plot operation or a plot operation having a dependency therewith. In order to plan a method of executing the changing plot operation in accordance with the added scale, the shape changing method planning section 3 is activated to calculate the optimal method. Finally, on the basis of the calculation result, the shape operation section 6 is activated to execute shape correction corresponding to the actually added scale. A method of calculating how the plotting is to executed in accordance with the added scale will be described in detail later.

(E) Shape Display Command

When a shape display command is selected, the shape display graphic processor 10 is activated to refer to the contents of the shape memory 9 and display the shape (shape display) on the graphic display 20.

(F) Scale Display Command

When a scale display command is selected, the scale relation searching section 4 refers to the contents of the history memory 7 or the dependency memory 12 and displays a scale of a formed shape (scale display) on the graphic display 20 via the scale graphic processor 11.

Figure 7:
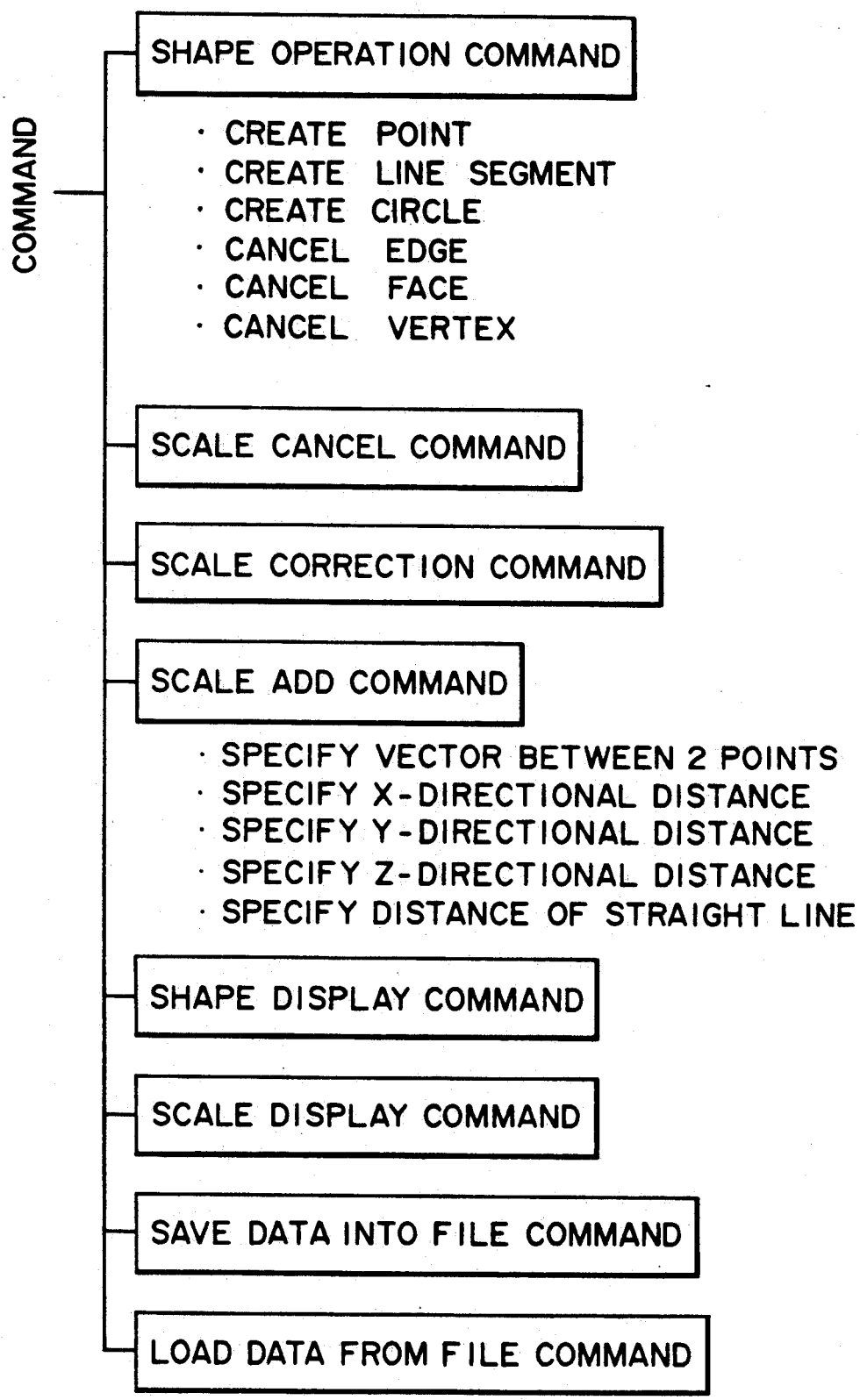
FIG. 7 is a view showing a command system representing types of commands which can be used in the present invention

The various commands described above are summarized in a command system shown in FIG. 7. Note that the types and contents of commands and accessory parameters are not limited to those described in the present specification.

Typical plot operations (functions defined by software) executed by the shape drawing operation section 6 of the present invention will be briefly described below.

Figure 8A:
Figure 8B:
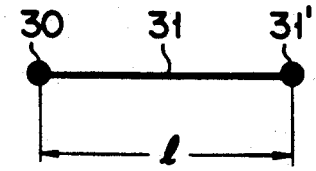
Figure 9A:
Figure 9B:
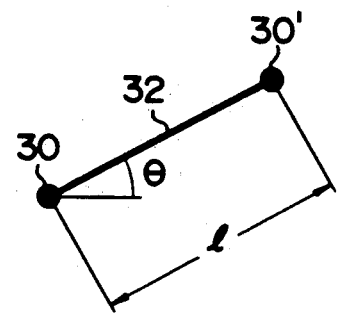
Figure 10A:
Figure 10A:
Figure 10B:
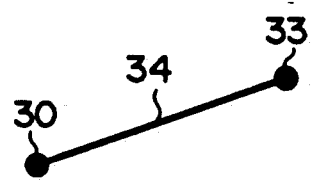

FIGS. 8A to 14B show the plot operations used when a shape is input. That is:

(1) FIGS. 8A and 8B show a plot operation for drawing a horizontal line segment 31 having a length of l from a point 30;

(2) FIGS. 9A and 9B show a plot operation for drawing a line segment 32 having a length of l along a straight line having an angle θ with respect to a horizontal direction from the point 30;

(3) FIGS. 10A and 10B show a plot operation for connecting two existing points 30 and 33 by a line segment 34;

(4) FIGS. 11A and 11B show a plot operation for drawing a circle 36 having a radius r about a point 35 to obtain points of intersection 38 and 39 with respect to a straight line 37;

(5) FIGS. 12A and 12B show a plot operation for drawing a common tangent 42 to two circles 40 and 41;

(6) FIGS. 13A and 13B show a plot operation for drawing a straight line parallel to (distance d) a straight line 43; and (7) FIGS. 14A and 14B show a plot operation for cancelling a part of a line segment 45 of two line segments 45 and 46.

That is, the above plot operations correspond to commands actually used by an operator to define a shape. These plot operations include various operations, e.g., a two-dimensional plot operation, face sweeping, and a three dimensional solid operation such as solid bonding. These plot operations provide a flexible environment with less limitations for shape definition. An operator can define a shape as if he or she were drawing a graphic pattern using a scale or compass. These plot operations are standardized and implemented on the basis of a non-manifold geometric model. FIGS. 8A to 14B show examples of an implemented two-dimensional plot operation. For example, a circle is divided into a plurality of segments because if a closed curve is expressed by a single segment, topolotical uncertainty remains in a shape data base of the non-manifold geometric model.

In view of a geometric constraint, execution of a plot operation reduces to defining a corresponding geometric constraint as a model. For example, the plot operation for specifying a reference point and a length to horizontally define a line segment shown in FIG. 8 defines a direction vector representing the distance and the line segment between the two points. A plot operation for specifying a center and a radius to draw a circle defines a geometric constraint for defining the distance between the center and a point on the circle. A plot operation for cancelling a shape element can provide a function of defining a more complicated geometric constraint. If any shape element can be cancelled, an operator can define even with an auxiliary shape element. An auxiliary line used to determine a position of a certain point is a good example of the auxiliary shape element.

Figure 15A:
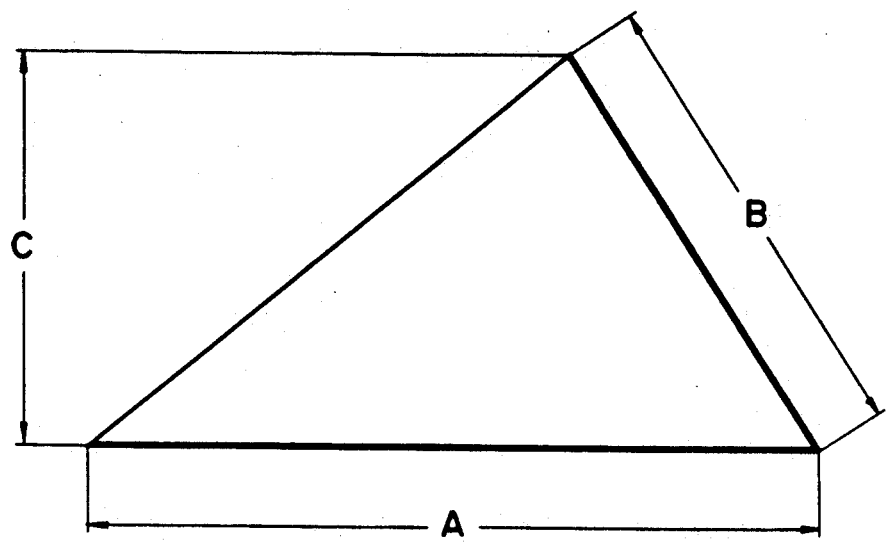
FIGS. 15A and 15B are views showing an example for explaining an effect of the present invention.
Figure 15B:
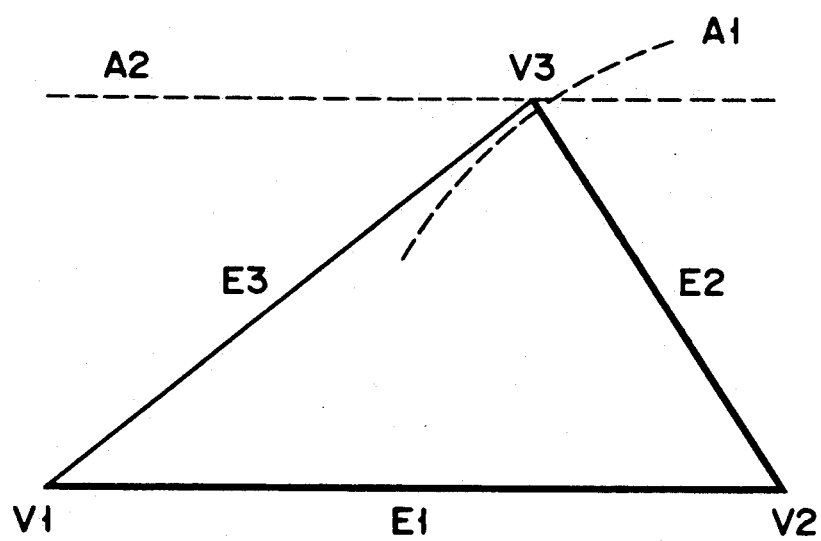
Figure 16:
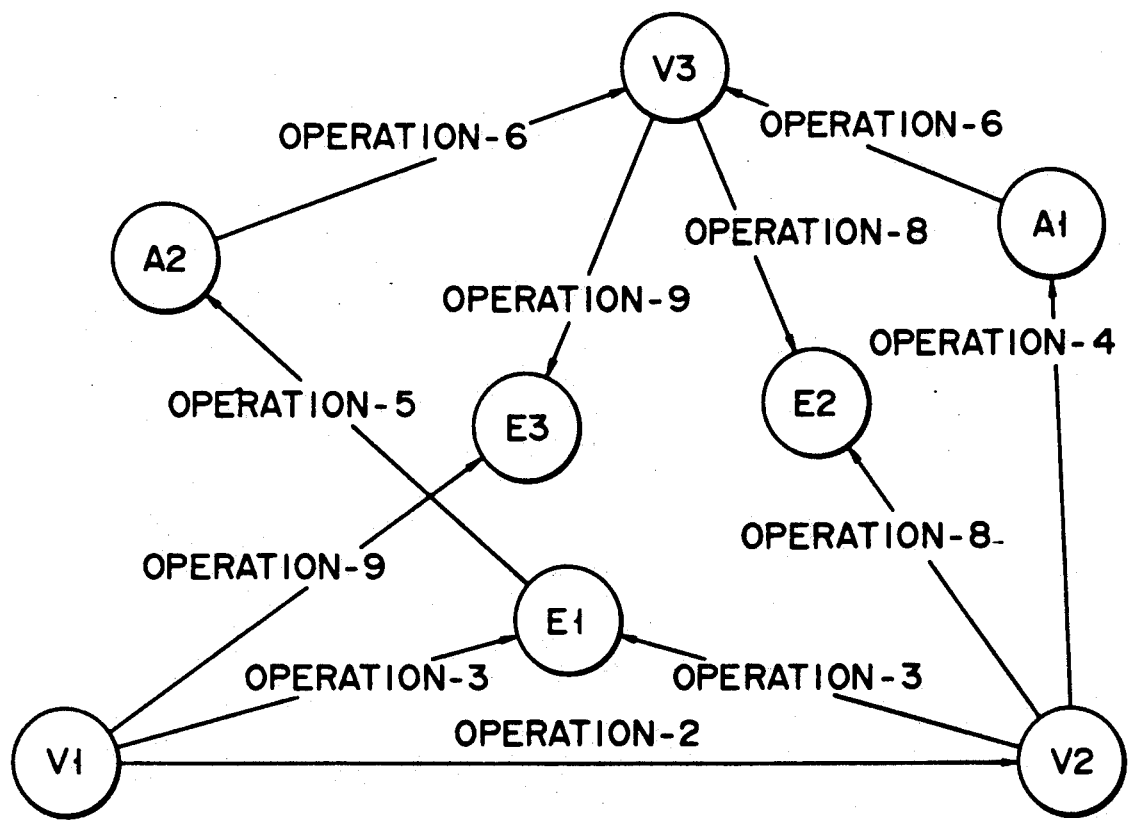
FIGS. 16 and 17 are schematic views showing a relation between plot operations and graphic elements of a geometric constraint (a manner of propagation) in FIGS. 15A and 15B.

Assume that a triangle as shown in FIG. 15A is defined with respect to this auxiliary line. Such a triangle is generally plotted by using two auxiliary lines A1 and A2 as shown in FIG. 15B in order to determine the position of a vertex V3. The following plot operations as shown in FIG. 16 can be assumed as examples.

Operation-1

Put a vertex V1.

Operation-2

Put a vertex V2 at a position predetermined relatively to the vertex V1 (a scale A is defined).

Operation-3

Connect the vertexes V1 and V2 by a line segment E1.

Operation-4

Draw a circle A1 (A1 is an auxiliary line) having the vertex V2 a its center (a scale B is determined).

Operation-5

Draw a straight line A2 (A2 is an auxiliary line) parallel to the line segment E1 (a scale C is defined).

Operation-6

Calculate a point of intersection between the circle A1 and the straight line A2 to obtain a vertex V3.

Operation-7

Erase the auxiliary lines A1 and A2.

Operation-8

Connect the vertexes V3 and V2 by a line segment E2.

Operation-9

Connect the vertexes V1 and V3 by a line segment E3.

The line A1 corresponds to a geometric constraint for defining a distance between the vertexes V3 and V2, and the line A2 corresponds to a geometric constraint for defining a distance between the vertex V3 and the line segment E1. Calculating the vertex V3 as a point of intersection between the lines A1 and A2 can be assumed as calculating a logical AND conjunction of geometric constraints of the two lines. By using these plot operations, an operator can directly define a geometric constraint one by one by executing the corresponding shape operation. From this point of view, a plot operation must be defined in correspondence with each basic geometric constraint. Such a basic plot operation, however, cannot be realized by a current solid model since the plot operation cannot express a wireframe, a surface, of a mixed state thereof. This is a main reason why the system of the present invention is based on the non-manifold geometric model.

More specifically, the plot operation is related to the following information.

(1) A shape element newly drawn up or cancelled.
(2) A shape element used as a reference.
(3) The type of geometric constraint defined by executing a plot operation.
(4) A scale value for determining a geometric relation.

Plot operations are classified mainly in accordance with the type of topological operation to be performed for a data base of a shape model, and subdivided by a corresponding geometric constraint. For example, the following variations can be assumed for a topological operation of drawing up one point for a data base of a shape model.

One variation is a shape operation of drawing up a point by directly specifying the position of the point by using absolute coordinate values x, y, and z. Since the position of the new point can be determined independently of other shape elements, no geometric relation is defined with respect to the other shape elements.

Another variation is a plot operation in which the position of a new point is calculated on the basis of positioning relative to a reference point. In this plot operation, a geometric constraint between the two points is defined, and this constraint propagates from the reference point to the new point. This means that the new point depends on the reference point in terms of positioning.

Still another variation is a plot operation for drawing up a new point as an intermediate point between two specified points. In this case, the new point depends on the two specified points. In this manner, plot operations are classified in accordance with the type of topological operation to be executed in a data base of a geometric model and then subdivided on the basis of a corresponding geometric constraint.

The executed plot operations are stored as histories in the history memory 7. At the same time, a plurality of geometric constraints and propagation manners of the plurality of geometric constraints are standardized and managed by the plot operations.

FIG. 16 is a directed graph schematically showing how a plurality of geometric constraints which are related to each other propagate according to the embodiment shown in FIG. 15. In this graph, each arc corresponds to an executed plot operation, and the direction of an arc indicates a propagation direction of a geometric constraint. Since a shape element drawn up later is not used as a reference, this graph is always acyclic. This is one of important features in handling a geometric constraint. In this directed graph, a root node (not having a parent node) indicates that a shape element corresponding to the node is independent from any other shape element in terms of a geometric constraint. All geometric constraints having effects on a certain specific shape element can be calculated by tracing back the graph. For example, as a geometric constraint related to E1, a scale A is calculated by tracing back corresponding arcs Operation-1, Operation-2, and Operation-3.

Another feature of this graph is that all arcs connecting nodes and their parent node correspond to the same plot operation. This is because these arcs correspond to a plot operation for drawing up a shape element corresponding to a specified node. In addition, a scale is defined between two shape elements, and a scale relation is defined by drawing up a new shape element on the basis of an existing shape element. Therefore, a plot operation related to a scale has only one corresponding arc. A plot operation having two or more arcs draws up a shape element simultaneously satisfying two or more scale constraints. For example, Operation-3 for drawing the line segment E3 corresponds to calculating an edge simultaneously satisfying constrains concerning the positions of the vertexes V1 and V2. Operation-6 corresponds to a logical AND conjunction of constraints represented by scales B and C.

Of the above various commands according to the present invention, the contents of the most significant commands, i.e., (B) scale cancelling command, (C) scale correction (shape correction) command, and (D) scale adding command will be described below with reference to simple examples.

(I) Scale Cancelling

Scale relation cancelling is mainly utilized when over-dimensioning occurs upon scale adding (to be described later). An individual scale relation can be cancelled by replacing a corresponding plot operation. As described above, for each plot operation, a plot operation for drawing up the same shape in terms of a topology but defining a different scale relation is provided. A scale relation is cancelled by replacing a shape operation corresponding to its plot operation by another plot operation (basically a plot operation using an absolute coordinate system) for performing the same topological operation and not defining the scale relation.

Figure 17:
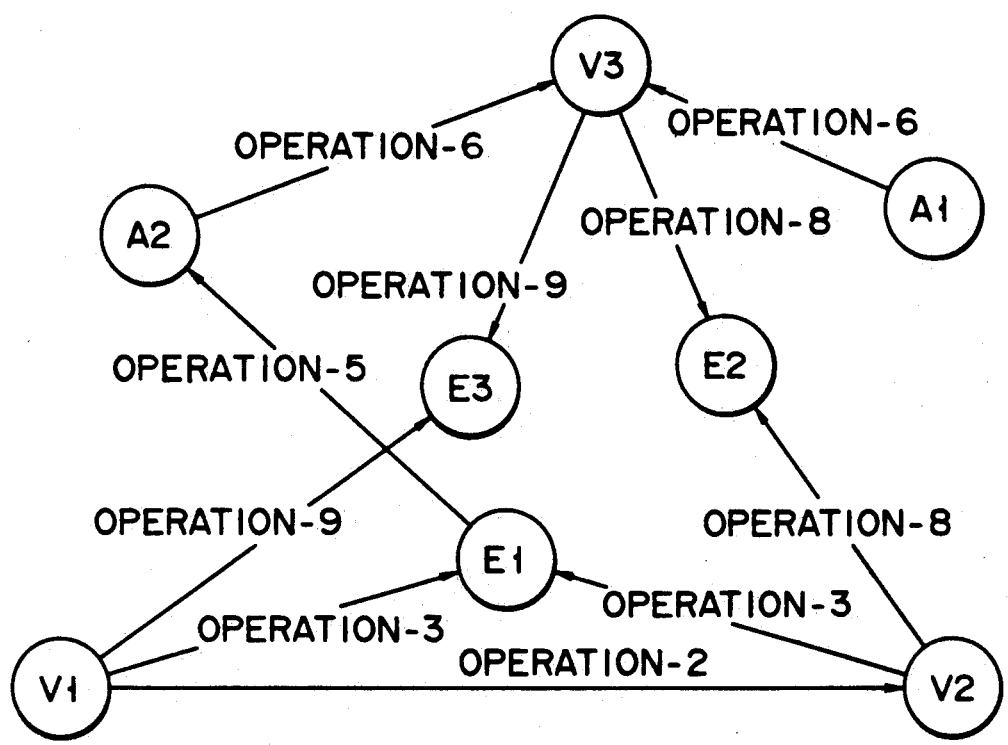

For example, the scale represented by B in FIG. 15A is cancelled by replacing the shape operation so that the center of the circle A1 is directly specified using values of the x, y, and z coordinates independent of the vertex V2. Although the default values of the x, y, and z coordinates are set to be the same as the vertex V2, the position of the circle A1 having the central coordinate point defined as an absolute coordinate point remains the same even if the position of the vertex V2 is changed. Therefore, a geometric constraint corresponding to Operation-4 does not propagate from vertex V2 to circle A1. In this case, the default value of the radius is set to be B. After this changing, a graph indicating how a geometric constraint propagates becomes as shown in FIG. 17, and nodes corresponding to the vertex V1 and the circle A1 become root nodes corresponding to the vertex V3. For example, the triangle shown in FIG. 15 is uniquely determined only when both the vertex V1 and the circle A1 are specified. That is, this triangle is insufficient in scale constraint after the scale is cancelled.

(II) Scale Correction (Shape Correction)

In the present invention, scale correction (shape correction) means an operation for automatically correcting a shape model when a scale value is changed. In the following description, assume that a topological change of a shape model does not occur.

As described above, a scale is a geometric constraint for defining a shape, and the geometric constraint is caused to correspond to a plot operation. When a scale is specified, a corresponding plot operation is uniquely determined. In this method, it is assumed that a shape satisfying an aggregation of given geometric constraints is calculated by executing a corresponding plot operation. Scale correction reduces to replacing a corresponding geometric constraint by using a new scale value. Replacing a geometric constraint corresponds to cancelling a corresponding plot operation and executing the operation again in accordance with a new value.

In order to calculate a shape satisfying the new geometric constraint aggregation, plot operations depending on scale correction may be cancelled and executed again in accordance with the new scale value. Alternatively, a shape data base may be reset to execute all the plot operations (from the beginning).

Referring back to FIGS. 15A and 15B, if the scale C is specified, Operation-5 is a corresponding plot operation. In this case, four plot operations from Operation-6 to Operation-9 depend on Operation-5 (i.e., all the operations after Operation-5 depend on Operation-5). In order to execute shape changing by cancelling plot operations, these four depending plot operations and the corresponding plot operation, i.e., five plot operations may be cancelled and executed again in accordance with the new scale value. In order to execute shape changing by resetting a shape data base, the nine plot operations may be executed from the beginning in accordance with the new scale value.

Theoretically, since a topological change in shape model is not taken into consideration, shape model correction can be executed without cancelling a topological operation corresponding to the shape data base or executing the operation again. That is, a shape model can be theoretically corrected by executing only geometric calculations. Recently, however, even a topological operation is cancelled and executed again in order to simplify implementation.

For easy understanding, this scale correction (shape correction) will be described below by comparing a conventional method with the method of the present invention.

For example, assume that information is added to the various plot operations shown in FIGS. 8A to 14B in accordance with an equation as a conventional example, thereby performing scale changing. In this case, adding information is not particularly required for (3) FIGS. 10A and 10B. In the case of (1) FIGS. 8A and 8B, however, an equation indicating that a difference between x coordinates of the two points 30 and 30' is 1 (the length of a line segment) is added. In the case of (2) FIGS. 9A and 9B, an equation indicating that an angle defined between the horizontal direction and a direction vector of the line segment 32 is $\theta$ and an equation indicating that a distance between the two points 30 and 30' is 1 (the length of the line segment) are added. In the case of (4) FIGS. 11A and 11B, an equation indicating the circle 36 having a radius r is added. In the case of (5) FIGS. 12A and 12B, an equation indicating that direction vectors of the two straight lines 43 and 44 are parallel to each other and an equation indicating that a distance from a point on one of the straight lines to the other is d are added. These equations must be solved as simultaneous equations.

If, however, a plot operation is not so simple as described above but rather complicated, it takes a very long time and requires a lot of labors for a user to add these equations without any addition or omission. In addition, it is difficult to generally and automatically solve multivariable simultaneous equations.

According to the shape and scale changing method of the present invention, an effect equivalent to conventional addition of adding information can be obtained by storing the type and order of plot operations, i.e., the history of plotting, without adding the information.

Figure 35:
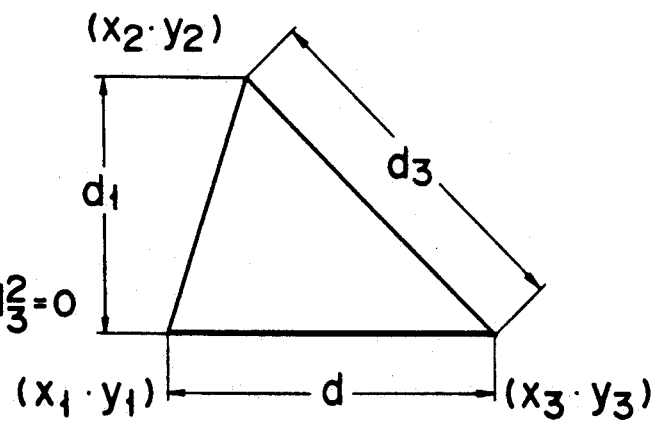
FIG. 35 is a view showing an example for explaining a shape input according to a conventional method.

FIGS. 18A to 18G show, on the basis of the conventional example shown in FIG. 35, how the effect equivalent to conventional addition of the adding information is obtained by the present invention. In the present invention, as shown in FIGS. 18A to 18F, plotting can be performed in accordance with the following sequence as when a general drawing specialist performs drafting on a drafting board as follows.

Figure 18A:
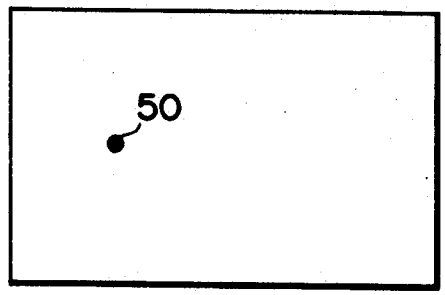
FIGS. 18A to 18G are views showing an example for explaining an effect of changing a scale and a shape of the present invention.

(1) As shown in FIG. 18A, a reference point 50 is put.

Figure 18E:
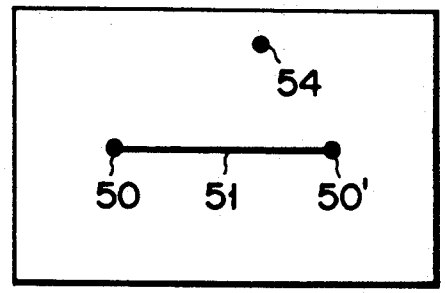
Figure 18B:
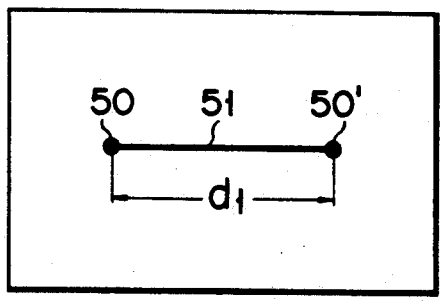

(2) As shown in FIG. 18B, a length d1 is specified to draw a line segment 51. A scale represented by d1 is assumed to be tacitly specified by this plot operation. Therefore, when the scale d1 is to be changed, a corresponding plot operation is an operation of drawing this line segment. That is, by this plot operation, a scale relation of the distance d1 can be extracted between points 50 and 50'. Since this plot operation is executed on the basis of the reference point 50, it is understood that the plot operation shown in FIG. 18B depends on the plot operation shown in FIG. 18A. That is, if the reference point 50 is put again, i.e., if the plot operation shown in FIG. 18A is retried to move this point, an influence of this operation acts on a line segment 51 drawn up by FIG. 18B to change its shape or position. It is one of the features of the present invention to store this dependency.

Figure 18F:
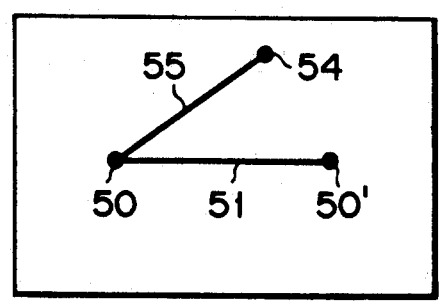
Figure 18C:
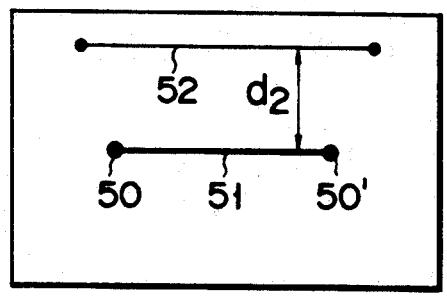

(3) As shown in FIG. 18C, a distance d2 is specified to draw a parallel line 52. This plot operation corresponds to a scale represented by d2 and depends of the plot operation shown in FIG. 18B.

Figure 18G:
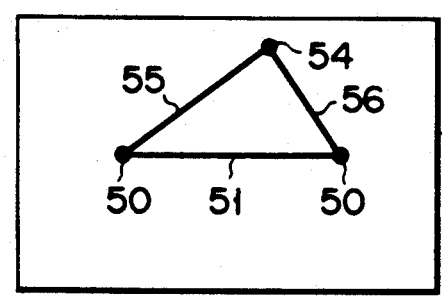
Figure 18D:
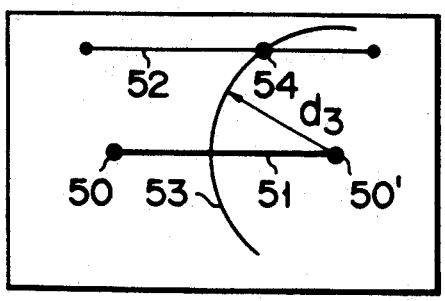

(4) As shown in FIG. 18D, a radius (distance) d3 is specified to draw a circle 53 having the radius d3, and a point of intersection 54 with respect to the line 52 is obtained. The plot operation corresponds to a scale represented by d3 and depends on the plot operation shown in FIG. 18B in which the reference point 50' as the center of the circle is drawn up.

(5) As shown in FIG. 18E, unnecessary lines (in this case the line segments 52 and 53) are erased. Such a line erased after it is drawn up once is assumed as an auxiliary line. Therefore, a shape which can be understood more easily can be displayed by reducing the width or changing the color of such an auxiliarily line and displaying it in addition to an actual shape.

(6) As shown in FIG. 18F, the point 50 is connected to the point of intersection 54 to draw up a line segment 55. This plot operation depends on the plot operation shown in FIG. 18A in which the point 50 is drawn up and the plot operation shown in FIG. 18E in which the point 54 is drawn up.

(7) As shown in FIG. 18G, the point 50' and the point of intersection 54 are connected to draw up a line segment 56. This plot operation depends on the plot operation shown in FIG. 18B in which the point 50' is drawn up and the plot operation shown in FIG. 18C in which the point 54 is drawn up.

Figure 19:
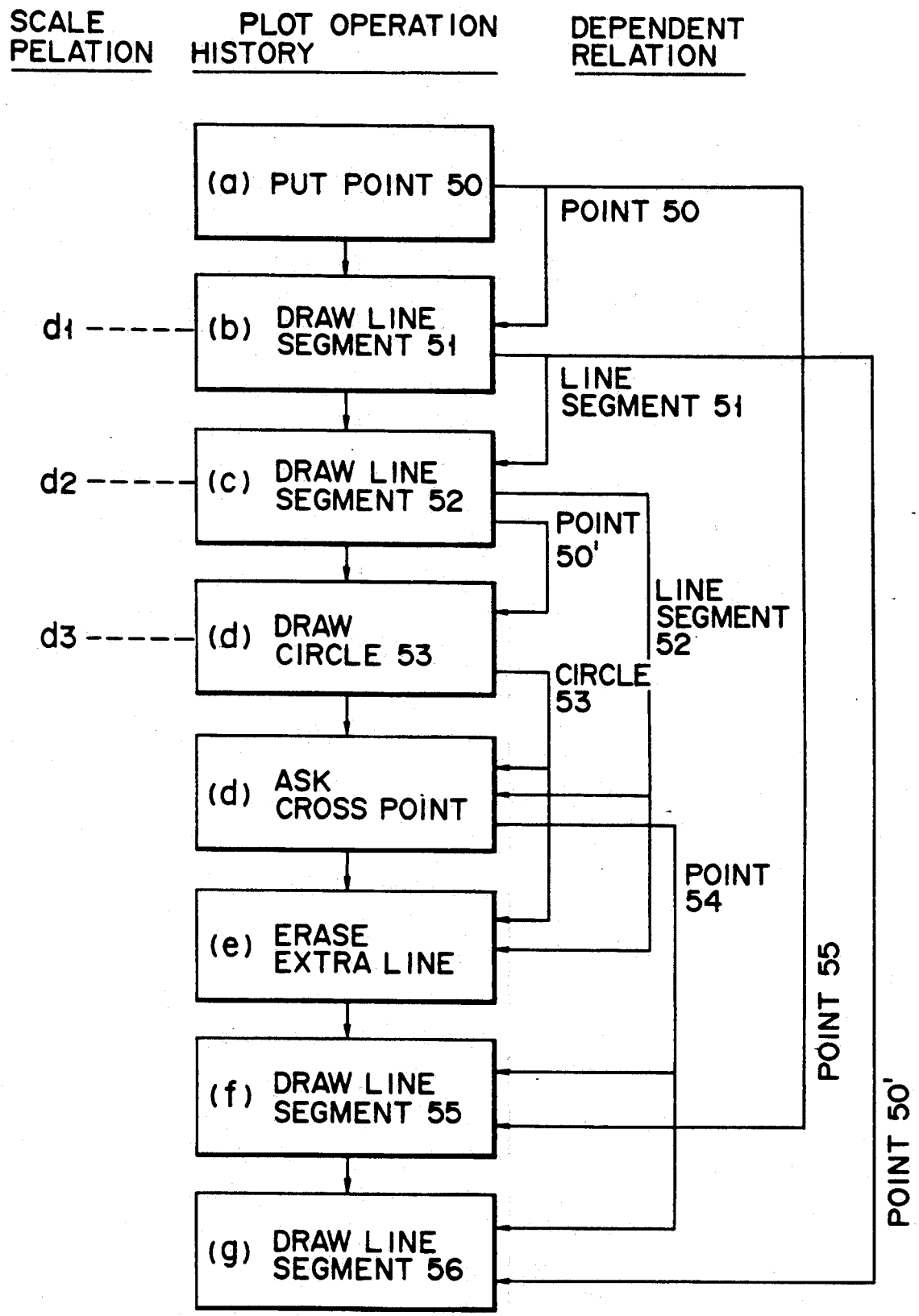
FIG. 19 is a schematic view showing a dependent relation between shape elements in the explanation of FIGS. 18A to 18G.

The scale relations extracted from the history memory and their dependencies can be expressed as a block diagram shown in FIG. 19.

When plot is performed in accordance with the above sequence, e.g., when a user designates changing of the scale d3, the plot contents stored in the history memory 7 or the contents stored in the dependency memory 12 are referred to search and find that a plot operation corresponding to this scale i the operation of drawing the circle 53 having the radius d3 shown in FIG. 18D by using the scale relation searching section 4. Thereafter, shape drawing up is executed again from the beginning by using the changed scale value as the radius of the plot operation of drawing the circle 53, and a shape corrected in accordance with the new scale is reconstructed. In addition to the above description method in which plot operation is executed again from the beginning to reconstruct a new shape, there is a method as one of the features of the present invention in which plotting is returned backward and then executed again.

In order to realize shape changing by "backward", processing is executed in accordance with the following sequence. That is, the scale relation searching section 4 searches to find that the scale d3 to be changed corresponds to the plot operation shown in FIG. 18D, and searches to find that the plot operations shown in FIG. 18E to 18G depend on this plot operation. If further plot operations depending on the plot operations in FIGS. 18E to 18G are present, the section 4 continuously executes similar searching until a plot operation having an indirect dependency is found.

In this case, since the operations shown in FIGS. 18E to 18G depend on the plot operation shown in FIG. 18D, a "reverse operation" is executed in an order opposite to that of executing the plot operations, i.e., an order of FIGS. 18G, 18F, 18E, and 18D, and the plot operation in FIG. 18D is executed again in accordance with the new scale. Thereafter, the plot operations are executed again in an order of FIGS. 18E, 18F, and 18G to reconstruct a shape in accordance with the new scale value.

In the above processing, shape operations (plot operations having dependencies) depending on the operation shown in FIG. 18D, i.e., plot operations according to shape elements having positions or shapes which may be changed in accordance with scale changing can be automatically searched from the plot contents stored in the history memory 7 or the contents of the dependency memory 12 by the scale relation searching section 4. Therefore, a user need not precisely remember shape portions which will be influenced by scale changing.

In the above description, the contents of the dependency memory 12 are also referred to search plot operations having dependencies with respect to a plot operation according to scale changing. As a simpler method, however, all of plot operations executed after a plot operation according to scale changing can be assumed to have dependencies in accordance with the stored contents of the history memory 7. That is, when the scale correction command is selected, a displayed scale portion to be corrected is picked up and selected by using the mouse or the like of the input section 1, and a new scale after correction is input from the key-board or the like. Upon pick-up of the scale to be corrected, the shape changing method planning section 3 is activated, and the scale relation searching section 4 is operated accordingly. The section 4 refers to only the contents of the history memory 7 (i.e., in this method, scale correction can be performed even when the dependency memory 12 is not included in the apparatus. This is one of reasons why the present invention is not limited to the arrangement shown in FIG. 1.), and searches and specifies a plot operation corresponding to the scale to be corrected. That is, the scale relation searching section searches a plot operation corresponding to the scale to be corrected and specifies the searched plot operation.

The shape changing method planning section 3 checks whether plotting is to be returned backward to an immediately preceding plot operation of the specified plot operation or plotting is to be retried from the beginning, i.e., determines which method is easier. This determination is similar to that described above.

After plotting is returned backward to the immediately preceding plot operation of the specified plot operation or retried from the beginning on the basis of the above determination, plotting is executed in accordance with the new scale after correction. Thereafter, plotting is performed by executing again (copying) the stored contents of the history memory 7 by using the shape operation section 6, thereby reproducing the shape to be obtained.

In this simple method, a1 of plot operations executed after a plot operation according to scale changing are processed as plot operations having dependencies. Therefore, the number of plot operations to be executed again may be increased (since plot operations not having dependencies may be included). This method, however is effective to reduce a dependency searching time or to simplify an arrangement by omitting the dependency memory 12.

When a plot operation corresponding to scale changing is searched, whether plotting is retried from the beginning or returned backward to perform shape correction automatically determined as described below. A method of checking whether plotting is retried from the beginning or returned backward will be described in detail below.

Plot operations to be executed or returned backward are calculated for the case in which plotting is retried from the beginning and the case in which plotting is returned backward to perform shape changing (e.g., correction). Each plot operation is added with a difficulty upon execution of the operation as a value of "weighting" in accordance with the number of vertexes, edges, and faces newly generated by the operation. A total value of the weighting values is calculated for each of the case in which plotting is retried from the beginning and the case in which plotting is returned backward to perform shape correction. Shape correction is preferably performed by a plot method having a smaller value.

That is, one method is:

(1) All or some of the number of plot operations required to execute shape correction are calculated. Determination is performed in accordance with the number of required plot operations or an evaluation value obtained by weighting the difficulty of each operation for the required number of plot operations.

More specifically, in the method of item (1), in order to weight the operation difficulty, values are set such that if an object of plot operations is a wireframe model (to be described later), weight 1 is set, if the object is a surface model, weight 3 is set, and if the object is a solid model, weight 10 is set.

In a shape operation, a plot difficulty is such that if a point is drawn up, weight 1 is set, if a line segment is drawn up, weight 2 is set, and if a face is drawn up, weight 5 is set.

Another method is:

(2) Each time a plot operation is executed, an arithmetic amount required to execute the operation is calculated. This calculated value is utilized as a weighting coefficient to determine how to perform shape correction and used as one of total determination references.

In the method of item (2), assuming that a triangular prism is to be drawn up, an arithmetic amount is weight $1 \times 1 = 1$ in a process of drawing up one point. In a process of drawing up one line segment and one point, an arithmetic amount is (weight $2 \times 1$)+(weight $1 \times 1$)=3. In a process of drawing up one face, an arithmetic amount is weight $5 \times 1 = 5$. In a process of drawing up four faces by sweeping, an arithmetic amount is weight $5 \times 4 = 20$.

Using either or both of the above methods of items (1) and (2), a total difficulty is calculated to adopt a method of checking whether plotting is to be returned backward or retried from the beginning.

It is a matter of course that the determination method is not limited to the above method but may be another.

(III) Scale Adding

A method of adding a scale constraint between two existing shape elements will be described below. A dependency between two plot operations is corrected in accordance with a scale constraint to be added. An added scale can be corrected after adding. In addition, a shape model can be automatically corrected similar to a scale defined by executing plot operations. Scale adding is performed substantially in accordance with the following sequence.

(1) Checking of whether over-dimensioning occurs by scale adding.

(2) Determination of a plot operation to which the added scale is caused to correspond.

(3) Calculation of a scale value (which is a preliminary value described above calculated by the scale value calculation processor 5) for the plot operation satisfying a given geometric constraint.

(4) Shape correction performed by cancelling or retrying plot operations.

Checking of whether over-dimensioning occurs by scale adding is the same as checking of whether a scale constraint is insufficient in an existing shape model. If a new scale constraint is added to a shape model, scale relations are defined in two or more ways between specified shape elements to cause over-dimensioning.

Figure 20:
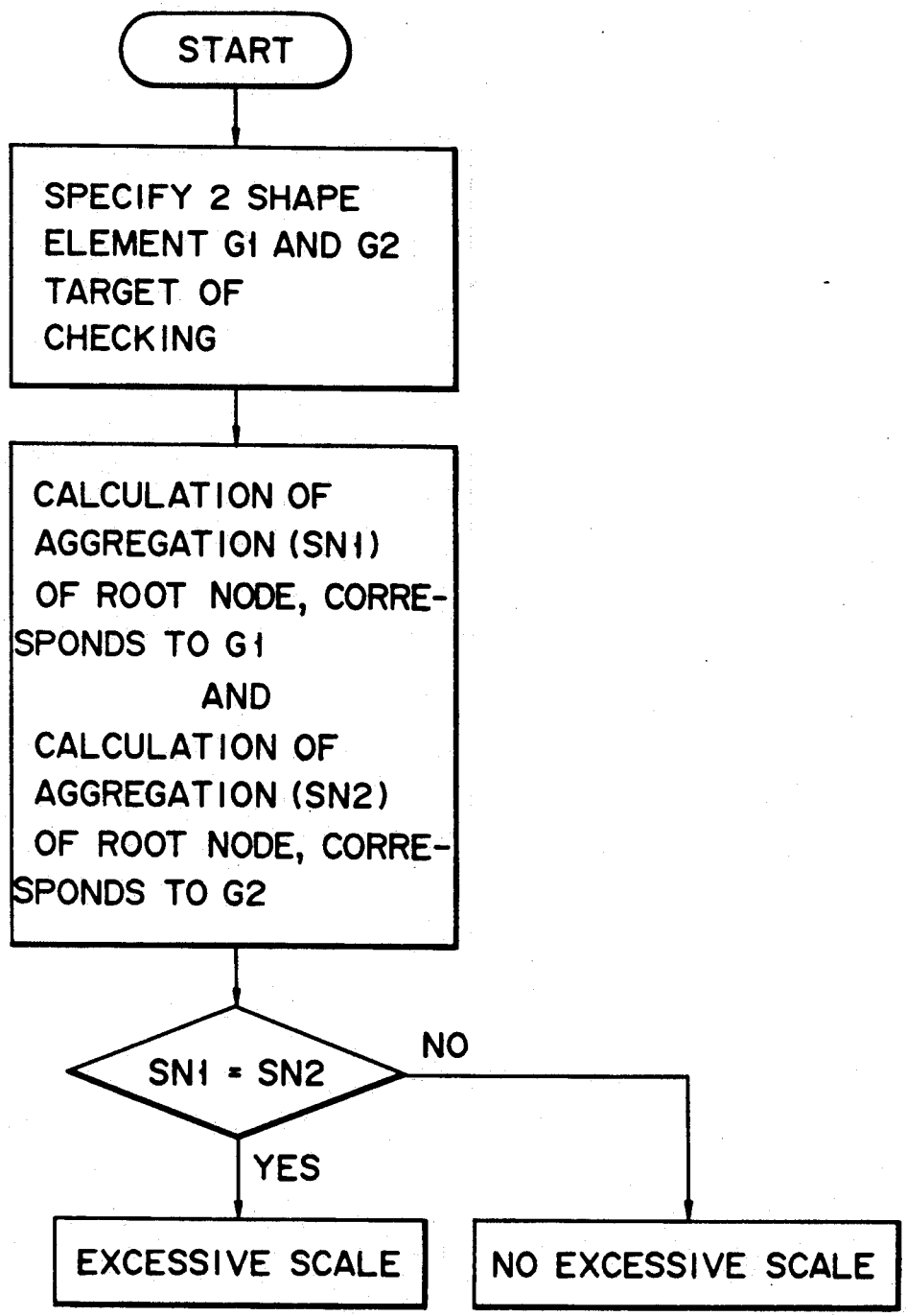
FIG. 20 is a flowchart for explaining an excessive scale checking process according to the present invention.

In order to check whether an existing geometric model is under-constrained, the number of root nodes corresponding to specified shape elements may be counted. Theoretically, whether a dependency exists between a shape element executed first from a plurality of shape elements to which a scale relation is to be added and a shape element executed next, i.e., between the first and second shape elements may be checked. For example, assume that G1 and G2 are specified shape elements and SN1 and SN2 are aggregations of root nodes corresponding to G1 and G2, respectively. G1 is uniquely determined only when the positions of all of shape elements corresponding to the respective elements of SN1 are specified. This is the same as for G2. That is, if SN1 and SN2 are equal to each other, G2 is uniquely determined when G1 is uniquely determined and vice versa. This fact indicates that the geometric model is not under-constrained as long as G1 and G2 are concerned. Note that this over-dimensioning checking process is shown in a flowchart of FIG. 20.

In the next stage, a plot operation to which a new scale constraint is caused to correspond must be determined. If SN1 and SN2 are different from each other, two cases can be assumed as follows.

In one case, no path is present between nodes of SN1 and SN2. In this case, two shape models are independently defined, and a new relation is added between the two shape models thereafter. Assuming that a shape element defined first in the shape elements of SN1 is G1', G2' is similarly selected from SN2. In addition, assume that N1 and N2 are nodes corresponding to G1' and G2', respectively. The new constraint is caused to correspond to a relation between the two shape elements G1' and G2'. If G1' is defined earlier than G2', the new constraint is expressed as a plot operation for drawing up G2' relatively to G1' so that the constraint is satisfied.

In the other case, a path is present between the nodes of SN1 and SN2, and a cancelled scale relation is present therebetween. FIG. 17 is a good example of this case in which the scale B shown in FIG. 15A is cancelled as described above. In this case, one of the elements of SN1 and SN2 corresponds to the cancelled geometric constraint, and a new constraint to be added is assigned to the cancelled geometric constraint.

When a plot operation to which the new constraint is assigned is determined, a scale value (preliminary scale value) for this plot operation must be calculated by using the scale value calculation processor 5. For example, in order to execute a plot operation for drawing a circle, the value of a radius must be calculated. In order to execute a plot operation for putting a point, positioning between two points must be calculated. Such a scale value is calculated by the geometric constraint section 8 for executing a calculation by propagating backward (tracing) a geometric constraint. For this reason, each plot operation is caused to correspond to a procedure of propagating backward a geometric constraint. For example, assuming that P1 and P2 are coordinates of a reference point and a point to be newly drawn up, respectively, and positioning is represented by a vector V, forward constraint propagation and backward constraint propagation are represented as follows:

$$P2 = P1 + V, P1 = P2 - V$$

Forward constraint propagation of a constraint representing a middle point P3 is represented by:

$$P3 = (P1 + P2)/2$$

Backward constraint propagation of the constraint of the point P3 is represented by:

$$P1 = P3 \times 2 - P2$$

$$P2 = P3 \times 2 - P1$$

where P1 and P2 are coordinates of the designated points, and P3 is coordinates of the middle point.

By using the above procedures, the geometric constraint section 8 calculates a geometric relation for a plot operation to which the new constraint is assigned.

In the first case in which no path is present between the nodes of SN1 and SN2, the relation between G1 and G1' is calculated by propagating a geometric constraint backward from G1 to G1', and the relation between G2 and G2' is similarly calculated. The relation between G1' and G2' is then calculated and set as an argument of the corresponding plot operation.

Figure 21:
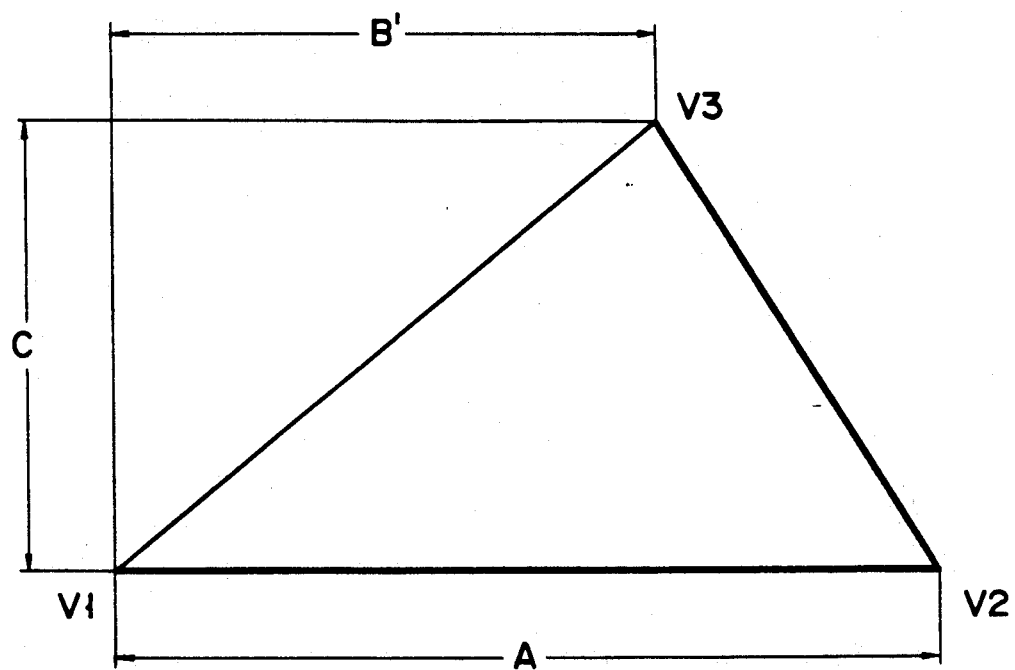
FIGS. 21 to 24 are views showing examples for explaining an effect of a scale adding process of the present invention.

In the second case in which a path is present between the nodes of SN1 and SN2, an argument of a plot operation corresponding to a cancelled geometric constraint is calculated by propagating the geometric constraint backward. For example, assume that a constraint represented by B' is added (the scale B is assumed to be cancelled already (see the item for explaining scale cancelling described above)) as shown in FIG. 21. This adding scale corresponds to a plot operation of drawing a circle since the circle A1 corresponds to a root node as shown in FIG. 17. In this case, the position of the vertex V3 is obtained by calculating a logical AND conjunction of a constraint represented by the existing scale C and a constraint represented by the new scale B'. The radius of the circle is calculated from the coordinates of the vertexes V2 and V3 and assigned as an argument to a corresponding plot operation. The preliminary scale value calculated as described above is related to a geometric constraint propagated backward. If the scale value of the backward propagated geometric constraint is changed, the scale value of the added constraint is calculated again by propagating the constraint backward to satisfy all the geometric constraints.

After scale value calculation, a shape model is reconstructed in the same manner as scale correction described above.

An operation sequence for adding a new scale to a portion not having a defined scale will be described in detail below by using a simple example. Assume that, by using the process flow shown in FIG. 20, it is already checked that over-dimensioning is not present or it is already checked that over-dimensioning is present and scale cancelling is already executed. An example in which an arbitrary scale relation is to be defined vertically between two vertexes will be described below.

FIGS. 22A to 22F show a process of forming a shape of this example before a scale is added as follows.

Figure 22A:
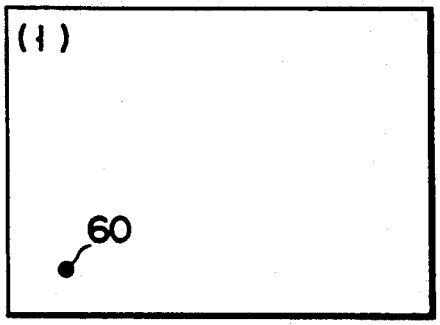

(1) As shown in FIG. 22A, a reference point 60 is put.

Figure 22B:
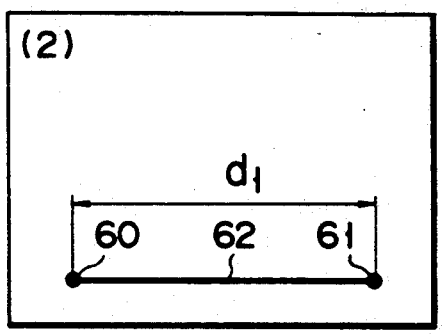

(2) As shown in FIG. 22B, a length d1 is specified from the point 60 to drawn up a line segment 62.

Figure 22C:
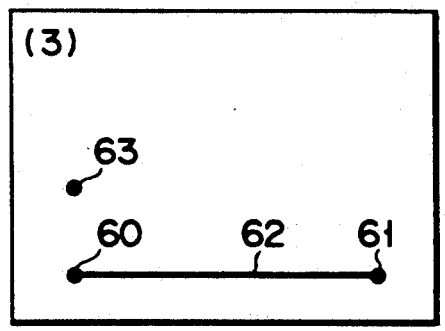

(3) As shown in FIG. 22C, another reference point 63 is put. This point 63 is not a point defined relatively to a certain (specific) point as a reference but a point having a position defined in an absolute coordinate system.

Figure 22D:
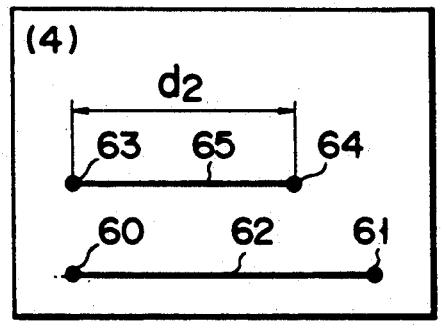

(4) As shown in FIG. 22D, a length d2 is specified from the point 63 to drawn up a line segment 65.

Figure 22E:
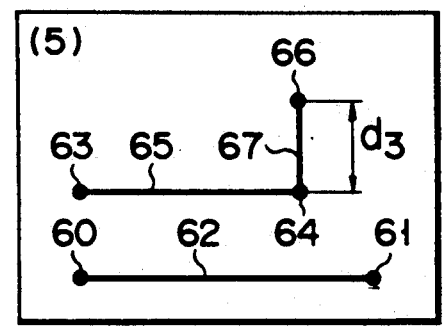

(5) As shown in FIG. 22E, a length d3 is specified from a point 64 to drawn up a line segment 67.

Figure 22F:
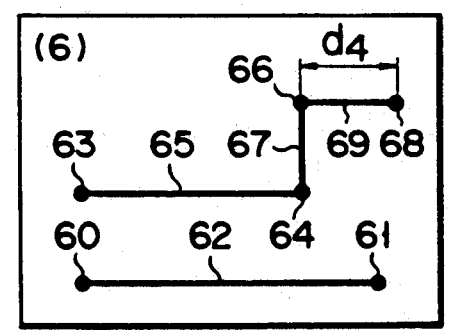

(6) As shown in FIG. 22F, a length d4 is specified from a point 66 to drawn up a line segment 69.

Assume that a scale relation represented by a length d5 (see FIG. 24) is to be added vertically to the vertexes 60 and 66.

Figure 23:
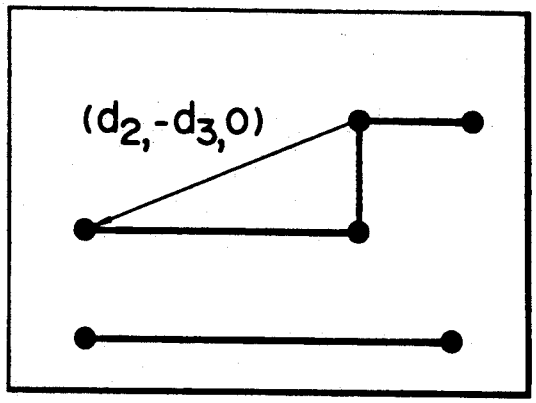
Figure 24:
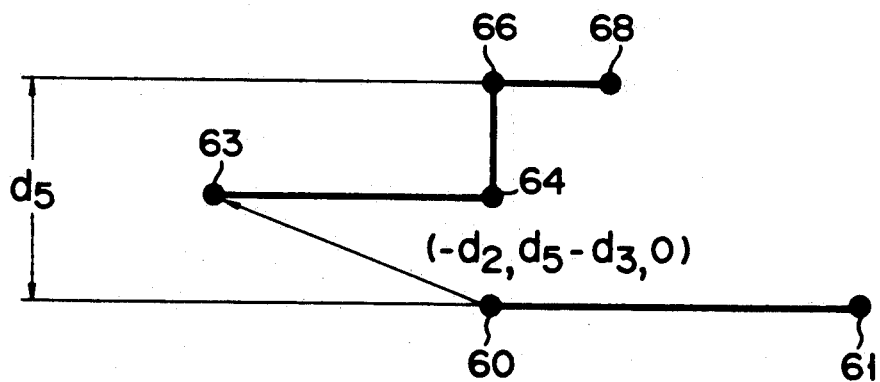

The plot operations for drawing up the vertexes 60 and 66 are those shown in FIGS. 22A and 22E, respectively. In this case, since the plot operation shown in FIG. 22A is executed earlier, the vertex 60 is used as a reference of scale adding (normally, one of two shape elements executed earlier is used as a reference of scale adding), and a moving method of moving the vertex 66 to a position predetermined relatively from the vertex 60. The plot operation shown in FIG. 22E for drawing up the vertex 66 depends on the plot operations shown in FIGS. 22C and 22D. According to these dependencies, it is understood that the vertex 63 drawn up by the plot operation shown in FIG. 22C is a reference used first when the vertex 66 is drawn up. Therefore, the vertex 63 is arranged to satisfy the added scale relation, and the plot operations shown in FIGS. 22D, 22E, and 22F depending on the plot operation shown in FIG. 22C for drawing up the vertex 63 are sequentially executed. By searching the contents of the plot operations shown in FIG. 22D and 22E, it can be calculated that the vertex 63 has positioning of ($-d2$, $-d3$, 0) (d2 and d3 are the lengths of the above line segments) with respect to the vertex 66 (see FIG. 23). Therefore, the vertex 63 may be drawn up (moved) at a position represented by ($-d2$, $-d5-d3$, 0) with respect to the vertex 60 (see FIG. 24). Thereafter, by sequentially executing the plot operations shown in FIGS. 22D, 22E, and 22F, the points 60 and 66 satisfy the corresponding scale relation (added scale d5), and the shape is reconstructed as shown in FIG. 24.

The vector ($-d2$, $d5-d3$, 0) required to retry the plot operation shown in FIG. 22C in order to draw up the point 63 at a relative position to the vertex 60 depends on the contents of the plot operations shown in FIGS. 22D and 22E. That is, in order to change the scales d2 and d3, the plot operations (shown in FIGS. 22D and 22E) after the plot operation shown in FIG. 22C depending on the scales are executed again.

Figure 25:
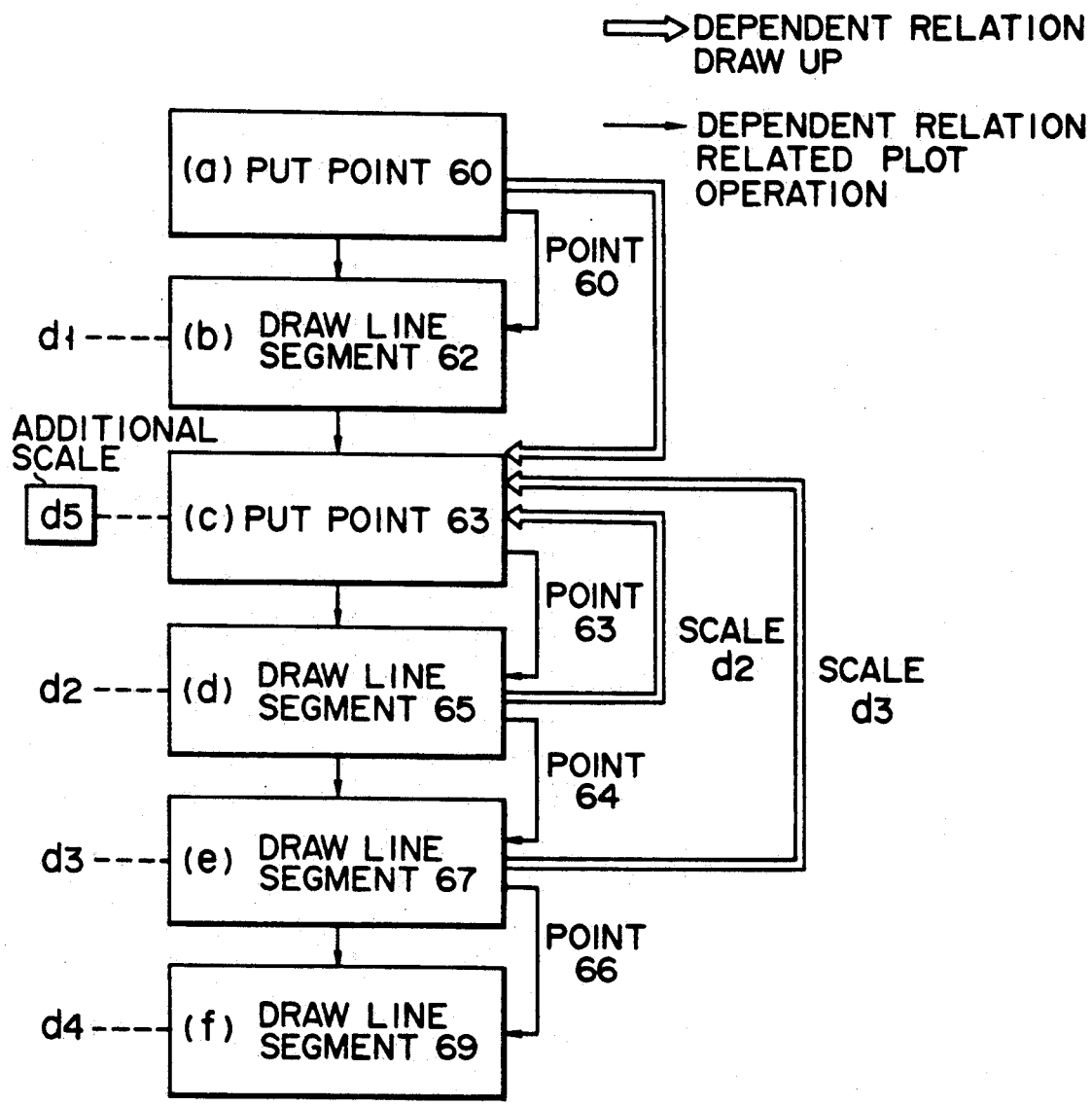
FIG. 25 is a schematic view showing dependent relations between shape elements in the explanations of FIGS. 22 to 24.

FIG. 25 shows dependency changing according to scale adding described above. Referring to FIG. 25, white arrows indicate dependencies concerning scale relations caused by scale adding and are used to calculate positioning. Unlike a dependency caused by a normal plot operation, the dependencies indicated by these arrows include dependencies with respect to plot operations executed before themselves. That is, while the dependency described above always does not affect a plot operation executed after itself, the dependency drawn up by scale adding has a relation with respect to a plot operation executed before itself.

In order to add the scale as described above, as in scale changing, whether plotting is to be retried from the beginning or to be returned backward to execute shape correction is automatically determined by a total value of weight values indicating difficulties.

In the above embodiment, shape drawing up of a two-dimensional graphic pattern is described. The present invention, however, can process a three-dimensional graphic pattern as well as a three-dimensional graphic pattern.

TABLE 1

NEW-VERTEX-ABS
LINE-REL-VERTEX-Y
LINE-REL-VERTEX-Y
N-CONNECT-LINE
MAKE-PLANE-FACE
SWEEP-E-LIST

Table 1 above shows some of commands of shape operations which can be utilized by a user in the embodiment of the present invention.

The above series of commands can be determined in correspondence with the plot operations described above.

That is, NEW-VERTEX-ABS is a command for drawing up a new point by specifying a position by absolute coordinates; LINE-REL-VERTEX-Y and LINE-REL-VERTEX-Y are commands for drawing up line segments, having lengths specified in the X and Y directions respectively, from a certain point; N-COONECT-LINE is a command for drawing up a line segment connecting two points; MAKE-PLANE-FACE is a command for specifying a string of line segments as contours and defining a plane inside the line segments and SWEEP-E-LIST is a command for specifying a string of edges as contours and sweeping internal faces by a specified vector. Although a lot of commands, in addition to the above commands, are prepared to realize various shape operations, a detailed description thereof will be omitted for the sake of simplicity.

In this case, a state in which only points or line segments are present corresponds to a state of wire-frame, and a state in which a face is made by MAKE-PLANE-FACE corresponds to a state of surface. A state in which a face is swept by SWEEP-E-LIST corresponds to a state of a solid because a three-dimensional solid is obtained. Therefore, in order to simultaneously realize the wireframe, the surface, and the solid, the shape drawing operation section 6, the shape memory 9, and the like may be constituted as software by using a Radial Edge structure ("Topological Structures for Geometric Modeling", Kevin Weiler, Ph. D Thesis, Rensselaer Polytechnic Institute, 1986) for a known non-manifold geometric model.

In the non-manifold geometric mode, a boundary of a solid is expressed by using shape elements such as faces, edges, and vertexes and their connection relations, thereby expressing a three-dimensional solid. The shape elements are classified into those relating to topological information for expressing a connection relation of faces or edges, and those relating to geometric information (geometry) for expressing an actual shape such as a face equation or a vertex position.

In the Radial Edge structure, the following shape elements are prepared.

| Topological elements: | model, region, shell, face-use, loop-use, edge-use, vertex-use |
|---|---|
| Geometrical elements: | face, loop, edge, vertex |

Figure 26:
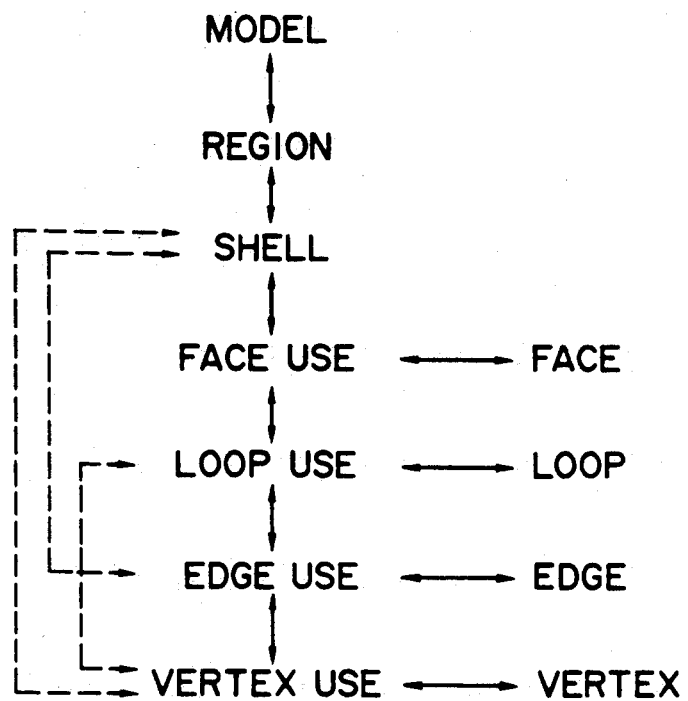
FIG. 26 is a view showing a hierarchical relation between shape elements in a (topological) non-manifold geometric model.

FIG. 26 shows a hierarchical relation between these shape elements. A geometric model is represented as a network based on this hierarchical relation. For example, upon information searching in which the name of an edge is specified to obtain coordinate values of its two end points, the values can be obtained by tracing data concerning upper shape elements or lower shape elements in the network, if necessary. In this manner, connection relations between the topological shape elements are expressed as a hierarchical network. Therefore, for one vertex, while only one "vertex" as a shape element relating to a geometry (coordinate values of the vertex) indicating the position of the vertex is present, a plurality of "vertex-uses" as a shape element relating to topology indicating a connection relation with respect to another "edge" may be present since relations with respect to all edges connected to the vertex are expressed as a network. This is the same for a relation between "face" and "face-use" for an edge and a relation between "edge" and "edge-use" for a face.

The definition of each shape element will be described below, and a relation with respect to an actual shape will be explained by taking a regular tetrahedron as an example.

"Vertex" and "vertex-use" are concepts representing a vertex.

"Vertex" has coordinates of a vertex, and "vertex-use" has topological information indicating a relation with respect to "edge-use" or the like. One "vertex" is present for one vertex, and "vertex-use" is present, with respect to the "vertex", in a number corresponding to the number of edges connected to the vertex. In the case of a regular tetrahedron, one "vertex" is present for one vertex, and three "vertex-uses" referring to the "vertex" are present. Each "vertex-use" and "edge-use" refer to each other by a pointer, thereby expressing a connection relation between a vertex and an edge (a relation indicated by a solid line between "edge-use" and "vertex-use" shown in FIG. 26).

"Edge" and "edge-use" are concepts representing an edge.

"Edge" has information for determining the shape of an edge, and "edge-use" has topology information. Generally, one "edge" is present for one edge, and "edge-use" is present in a number corresponding to the number of faces connected to the edge. In the case of a regular tetrahedron, one "edge" and two "edge-uses" are present since two faces are connected to one edge.

"Edge-use" and "loop-use" as a shape element indicating the boundary of a face refer to each other by a pointer, and this pointer expresses a relation between the boundary of the face and edges as its components (a relation indicated by a solid line between "loop-use" and "edge-use" shown in FIG. 26). Note that in the case of a wireframe, since it does not have a concept of a face, it and "shell" to be described later refer to each other by a pointer (a relation indicated by a broken line between "shell" and "edge-use" shown in FIG. 26).

"Loop" and "loop-use" are concepts representing the boundary of a face and contours formed by a continuous edge. While one boundary is present for a face without a hole, a plurality of boundaries are present for a face having a hole. "Loop" corresponds to a boundary itself, and "loop-use" is used to express a connection relation with respect to upper "face" or lower "edge". In the case of a regular tetrahedron, for example, one "loop" and one "loop-use" are present for one boundary. In the case of "surface" having front and rear surfaces, one "loop" is present for one boundary, and two "loop uses" are present for the front and rear surfaces. "Loop-use" has "face-use" as a concept of an upper face. "Loop-use" and "face-use" as a concept of an upper face refer to each other by a pointer (a relation indicated by a solid line between "face-use" and "loop-use" shown in FIG. 26).

"Face" and "face-use" are concepts representing a face. "Face" is a concept representing a face itself and has information (e.g., a face equation) required to determine a geometrical shape. "Face-use" is a shape element for expressing a topological connection relation of a face. One or two "face-uses" are present for one "face". In the case of a regular tetrahedron, one "face-use" is present for one "face". In the case of "surface" having front and rear surfaces, "face-use" is present for each of the front and rear surface. As a result, one "face-use" is present for one "face". "Face-use" and a shape element called "shell" as a concept representing a closed-boundary face constituted by a plurality of faces refer to each other by a pointer (a relation indicated by a solid line between "shell" and "face-use" shown in FIG. 26).

"Shell" is a concept representing a surface or a boundary face and represents a closed face constituted by a plurality of "faces". In the case of a regular tetrahedron, for example, four faces form one closed face to divide internal and external regions of the regular tetrahedron. Therefore, these four "faces" and "face-use" form "shell". In the case of "surface", no region is present inside it. Since, however, "surface" can be generally considered as a degenerated solid, front and rear "face-uses" form "shell". In the case of "wireframe", no boundary face as described above is present. For convenience in expression, however, an aggregation of connected lines is considered as "shell".

"Region" is an upper concept of "shell" and represents a concept of a region in a three-dimensional space divided by "shell". Generally, one "region" representing a region outside a solid and a plurality of "regions" representing the interior of "shell" are present. For one regular tetrahedron, two "regions" are present inside and outside the regular tetrahedron. Note that it is difficult to classify "wireframe", "wireframe" is included in "region" representing an external region of a solid. That is, it is assumed that one "region" including "wireframe is present in an external region of a solid and a plurality of "regions" representing the interior of "shell" are present.

"Model" is the concept of a geometric model including all "regions" described above and is an access start point for all the shape elements. Generally, one "model" is present for one shape model. A plurality of solids, however, may be present in one "model" in the case of, e.g., a shape drawing up process. If one regular tetrahedron is present, the regular tetrahedron is referred to by one "model", and this "model" serves as an entrance of a network expressing shape data. Therefore, in order to obtain data of the tetrahedron, the network is traced first from this "model".

The above hierarchical structure and connection relations between shape elements are summarized and classified into the case of "wireframe" and the case of "surface" and "solid" as described by the following items (I) and (II).

(I) "Wireframe"

Figure 27:
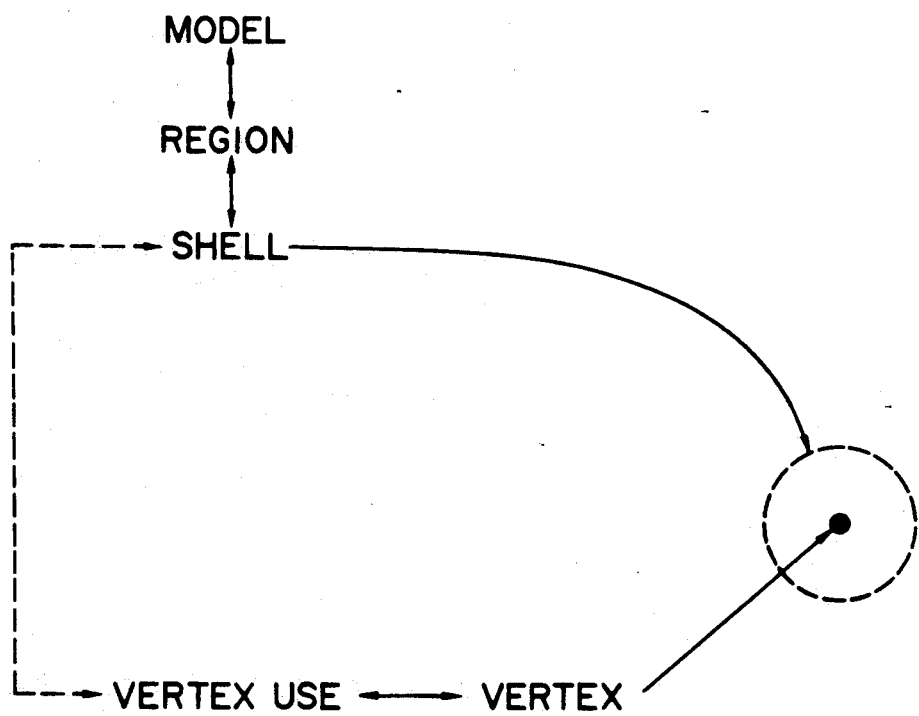
FIG. 27 is a view showing a data structure obtained in the case of an isolated point in the model in FIG. 26.
Figure 28:
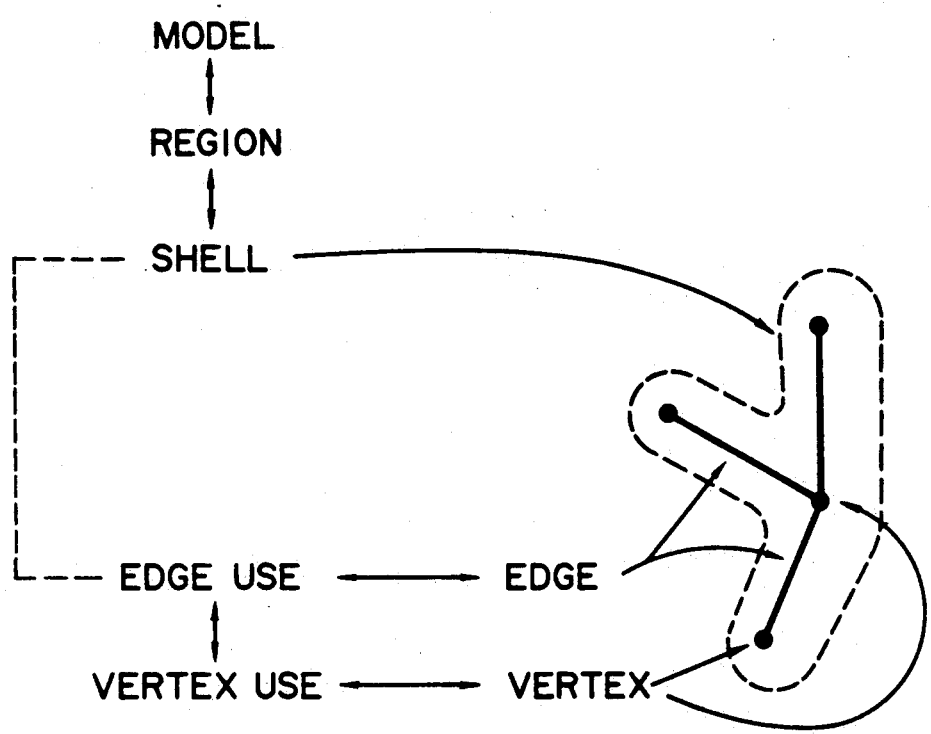
FIG. 28 is a view showing a data structure obtained in the case of a wireframe in the model in FIG. 26.

In the case of "wireframe", a hierarchical structure is obtained in an order of "region", "shell", "edge-use", and "vertex-use". If a point is isolated in a space, this point is considered as "wireframe". In this case, "shell" directly indicates "vertex-use", and the "vertex-use" indicates "vertex" (see FIG. 27). If a line segment is present, continuous line segments collectively form "shell", and the "shell" has "edge-use". The "edge-use" has "edge" and "vertex-use" at its two ends, and the "vertex-use" indicates "vertex" (see FIG. 28). The "vertex" has information of all the "vertex-uses" referring to the "vertex". Therefore, in order to obtain all "edges" connected to a certain (specific) "vertex", all "vertex-uses" may be obtained from the "vertex" to trace "edge-uses" referring to the "vertex-uses".

(II) "Surface" & "Solid"

Figure 29:
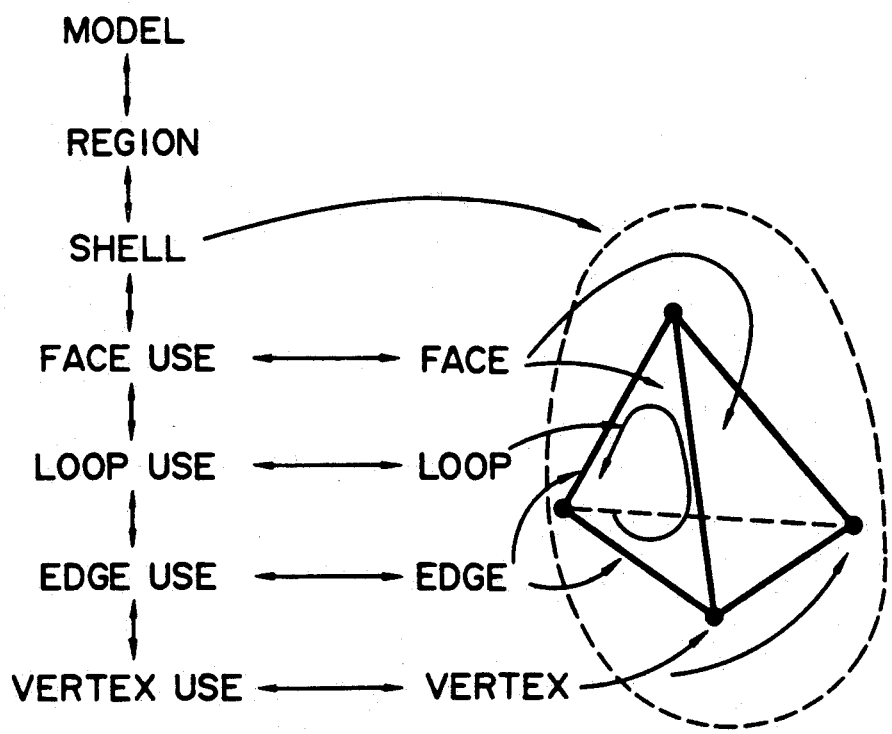
FIG. 29 is a view showing a data structure obtained in the case of a tetrahedron in the model in FIG. 26.
Figure 30:
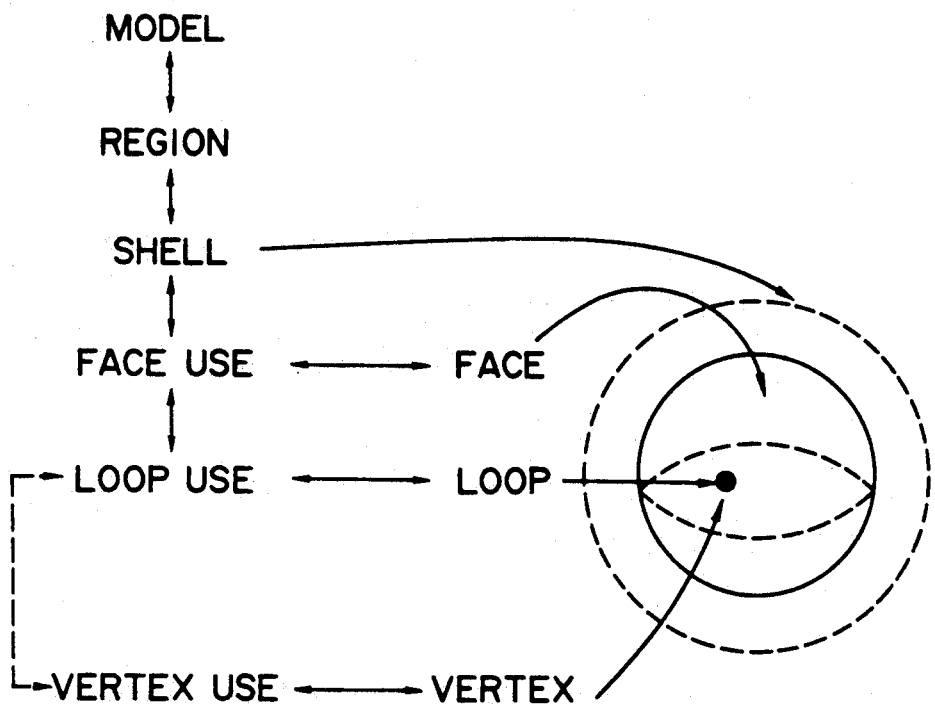
FIG. 30 is a view showing a data structure when only one point is present on a face in the model in FIG. 26.

In the case of "surface" and "solid", a hierarchical structure is obtained in an order of "region", "shell", "face-use", "loop-use", "edge-use", and "vertex-use" (see FIG. 29). As a special case, however, if only one point is present on a balloon-like face (note that a state in which only "face" is present and no "vertex" nor "edge" is present thereon is not allowed), "loop-use" directly indicates "vertex-use" since one "vertex-use" is considered to from a boundary (see FIG. 30).

As described above, in the Radial Edge structure, "surface" is considered as degenerated "solid", and "surface" and "solid" are substantially simultaneously processed. In order to distinguish "surface" and "solid" from each other and to correctly express a connection relation, two concepts, e.g., a "mate" relation and a "radial" relation are introduced.

The "mate" relation is used for front and rear "face-uses" of "surface". This "mate" relation relates to "face-use" and "edge-use". If a front-and-rear relation is present between shape elements concerning two topologies, the "mate" relation is defined to indicate a corresponding shape element. If another "face-use" is referred to by the "mate" relation of the "face-use", this face represents "surface". If the "mate" relation does not refer to anything, this face represents a face of a solid.

The "radial" relation is a data structure for tracing adjacent faces via an edge and defined to refer to adjacent "edge-uses" along a rotation direction assuming that the edge is a rotation axis. In a general solid, only two right and left faces are present for one edge. If, however, a number of faces are connected to one axis like wings, many faces are present for one edge to obscure its order relation. In this case, the "radial" relation is traced from one face to obtain adjacent faces, thereby determining the order of faces.

The data structure formed by shape elements will be described in detail below by taking a data structure mainly concerning phase information as an example.

Figure 31:
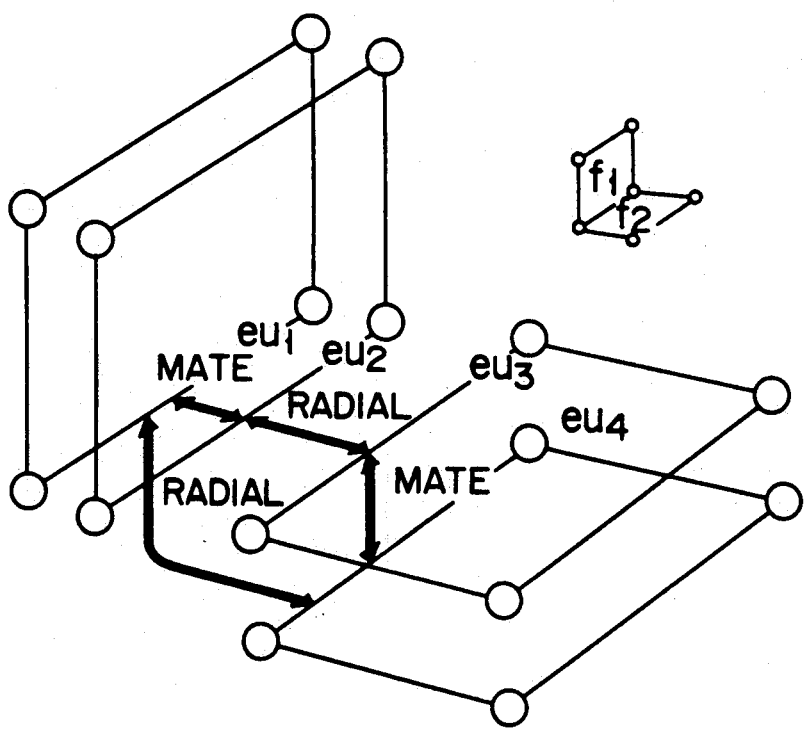
FIG. 31 is a view showing a data structure obtained when two surfaces are connected via one edge in the model in FIG. 26.
Figure 32:
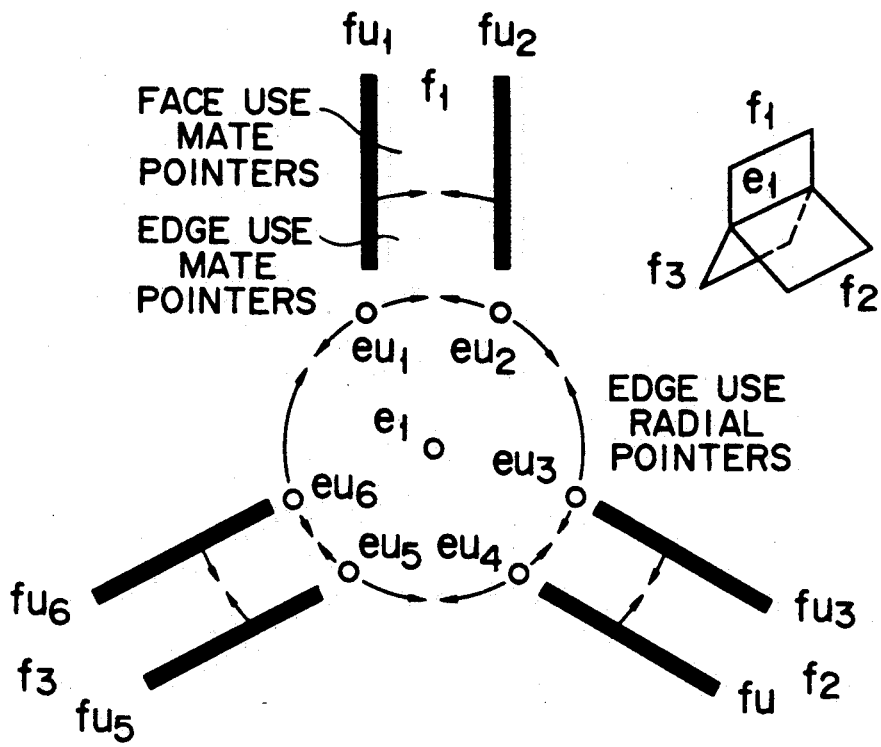
FIG. 32 is a view showing a data structure obtained when three surfaces are connected via one edge in the model in FIG. 26.

FIG. 31 shows a state in which two "surfaces" (f1 and f2) are connected via one edge. "Edge" for connecting two faces has four "edge-uses" ($eu_1$, $eu_2$, $eu_3$, and $eu_4$). These "edge-uses" refer to each other by the "mate" and "radial" relations. Another edge has two "edge-uses" (not shown). These "edge-uses" refer to each other by the "mate" relation. FIG. 32 shows a data structure about the central axis of a state in which three "surfaces" (f1, f2, and f3) are connected via one edge ("edge": e1). If three or more "faces" are present for one axis as shown in FIG. 32, an order relation between the "faces" f1, f2, and f3 cannot be obtained unless the "radial" relation is traced.

Figure 33:
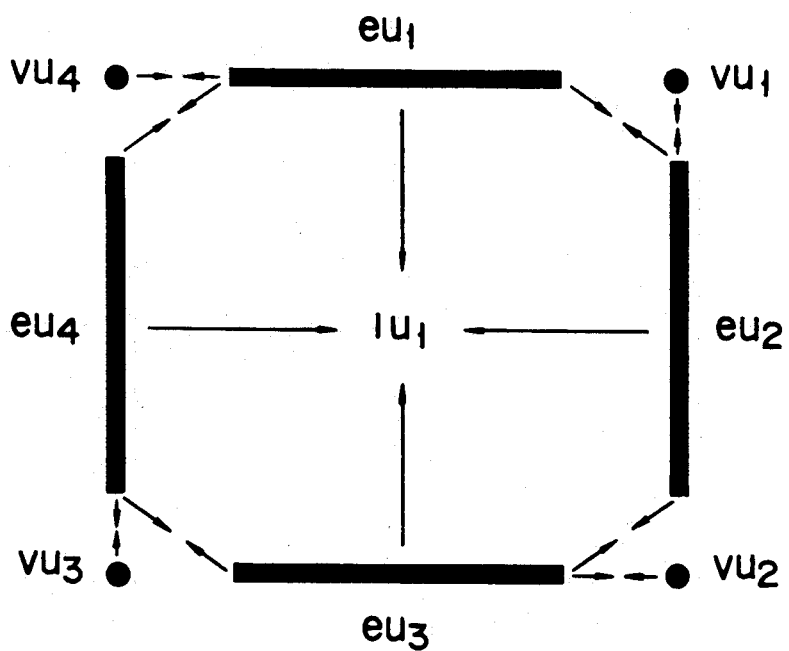
FIG. 33 is a view showing a relation between loop-use, edge-use, and vertex-use in the model in FIG. 26.

FIG. 33 shows a relation between "loop-use", "edge-use", and "vertex-use". "Loop-use" $lu_1$ has "edge-uses" $eu_1$, $eu_4$, $eu_3$, and $eu_2$ belonging to itself in a counter-clockwise order. As shown in FIG. 32, since each "edge-use" refers to corresponding "vertex-use" ($vu_1$, $vu_2$, $vu_3$, or $vu_4$), "vertexes" or "vertex-uses" can be sequentially obtained by sequentially tracing "edge-uses" along a contour.

Figure 34:
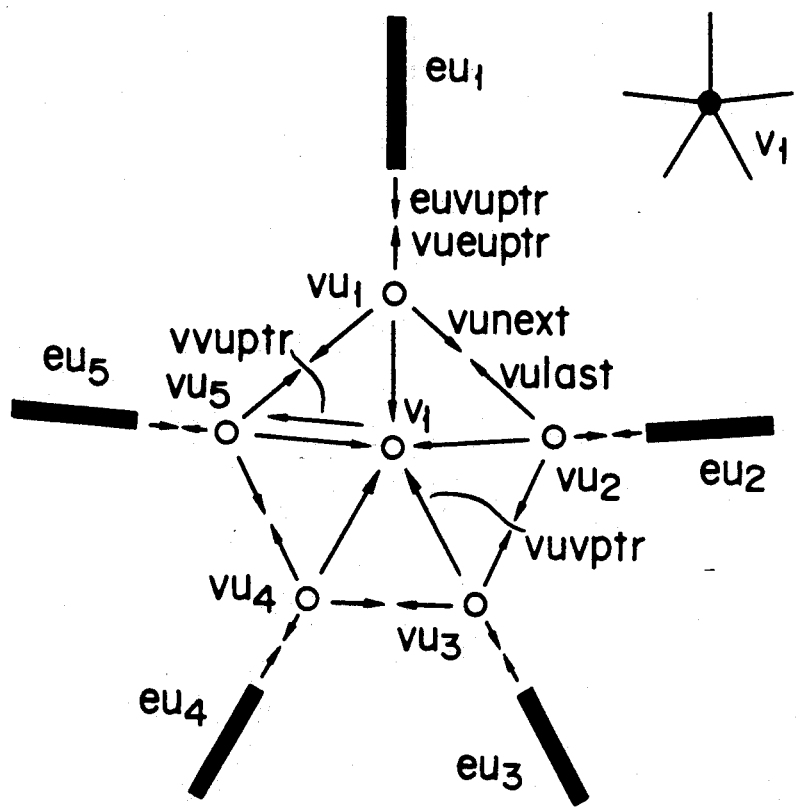
FIG. 34 is a view showing a data structure obtained when five edges are connected to one point in the model in FIG. 26.

FIG. 34 shows a data structure of "wireframe" in which five edges are connected to one point (V1). In "wireframe", since it is difficult to determine an order relation between edges connected to a point, a concept such as the "radial" relation is not present. Referring to FIG. 34, the "vertex" V1 refers to five "vertex-uses" ($vu_1$, $vu_2$, $vu_3$, $vu_4$, and $vu_5$), thereby tracing five "edge-uses" ($eu_1$, $eu_2$, $eu_3$, $eu_4$, and $eu_5$).

In the present invention, the shape operation section 6, the shape memory 9, and the like are constituted as software programs by using the above Radial Edge structure for a non-manifold geometric model. Therefore, the present invention can be applied to a three-dimensional graphic pattern requiring "wireframe", "surface", and "solid" at the same time.

As has been described above, according to the present invention, plot operations performed by a user are stored in the history memory, information of scale relations and dependencies between the relations are extracted from the stored information, and the extracted information is stored in the dependency memory. Upon scale changing or scale adding, the history memory or the dependency memory is referred to search a plot operation related to shape changing, and a reverse operation or the like of the plot operation is automatically executed. Therefore, the shape changing can be efficiently performed without adding information for shape changing to a shape model. Especially in shape correction, since only information of a plot operation history executed by a user is utilized, the type of a shape to be processed is not limited to realize high versatility.

The present invention is not limited to the above embodiments but can be variously modified and applied without departing from the spirit and scope of the invention.

What is claimed is:

1. A shape modeling apparatus comprising:
   inputting means for inputting an input command or input data for forming a two- or three-dimensional shape or changing the formed shape;
   command analyzing means for syntactic-analyzing the input command or the input data;
   processing means for executing a plot operation on the basis of the input command and the input data, thereby forming a shape or changing the formed shape or scale to obtain a new shape; and
   display means for displaying the shape formed by said processing means,
   wherein said processing means comprises:
   shape operating means capable of executing a plot operation for forming or changing the shape and executing a reverse operation of the plot operation if necessary, information memory means having geometric constraint propagating means including control programs for performing plot processing by referring to geometric constraint data for storing the plot operations executed upon formation of the shape and geometric constraints for defining the shape to be formed, and shape memory means for storing a shape formed by each of the plot operations, searching means for, when a portion to be changed such as a scale is specified, referring to stored contents in said information memory means to search changing information required for changing, and shape display processing means and scale display processing means such as a graphic processor for processing and displaying a shape and a scale on said display means, respectively; and wherein said shape operating means is activated in accordance with changing information of said searching means to change the shape or scale;

wherein said searching means performs, when scale correction for changing the scale to automatically change the shape in accordance with the shape is to be performed, referring to the contents of dependency memory means for storing dependencies between plot operations executed when the shape is input and formed to search all plot operations having dependencies with respect to the scale to be corrected, and replacing the plot operations having the dependencies as the changing information by new plot operations executed again in accordance with a new scale after changing;

shape changing method planning means including control programs for checking, upon execution of said scale correction step, whether reverse operations of plot operations are to be executed in a reverse order by referring to predetermined stored information to a completion state of an immediately preceding plot operation of a plot operation executed earliest in an order of a plurality of plot operations for which said scale correction step is to be executed, thereby sequentially cancelling the plot operations backward, or the plot operations are to be retried from the beginning by referring to the predetermined stored information, and wherein the processing means is based upon a nonmanifold geometric mode.

2. A shape modeling apparatus comprising:

inputting means for inputting an input command or input data for forming a two- or three-dimensional shape or changing the formed shape;

command analyzing means for syntactic-analyzing the input command or the input data;

processing means for executing a plot operation on the basis of the input command and the input data, thereby forming a shape or changing the formed shape or scale to obtain a new shape;

display means for displaying the shape formed by said processing means, wherein said processing means comprises:

shape operating means capable of executing a plot operation for forming or changing the shape and executing a reverse operation of the plot operation if necessary, information memory means having geometric constraint propagating means including control programs for performing plot processing by referring to geometric constraint data for storing the plot operations executed upon formation of the shape and geometric constraints for defining the shape to be formed, and shape memory means for storing a shape formed by each of the plot operations, searching means for, when a portion to be changed such as a scale is specified, referring to stored contents in said information memory means to search changing information required for changing, shape display processing means and scale display processing means such as a graphic processor for processing and displaying a shape and a scale on said display means, respectively;

wherein said shape operating means is activated in accordance with changing information of said searching means to change the shape or scale;

wherein said information memory means further includes history memory means for storing history information including a plot method or plot contents of each of plot operations executed when the shape is input and formed, and an order of the plot operations;

wherein said searching means performs, when scale adding for defining a scale relation as a dependency between a plurality of plot operations not having a dependency therebetween to be performed, searching a dependency present between the plot operations corresponding to the scale to be added, and correcting the dependency as the changing information into a scale relation corresponding to the scale to be added; and wherein the changing information is obtained by calculating a moving procedure in which, assuming that a plot operation executed first in an order of a plurality of plot operations to which the scale is to be added is a first reference plot operation, predetermined conditions for arranging plot operations executed from a second plot operation at predetermined positions with respect to the first reference plot operation are satisfied.

3. A shape modeling apparatus comprising:

inputting means for inputting an input command or input data for forming a two- or three-dimensional shape or changing the formed shape;

command analyzing means for syntactic-analyzing the input command or the input data;

processing means for executing a plot operation on the basis of the input command and the input data, thereby forming a shape or changing the formed shape or scale to obtain a new shape;

display means for displaying the shape formed by said processing means, wherein said processing means comprises:

shape operating means capable of executing a plot operation for forming or changing the shape and executing a reverse operation of the plot operation if necessary, information memory means having geometric constraint propagating means including control programs for performing plot processing by referring to geometric constraint data for storing the plot operations executed upon formation of the shape and geometric constraints for defining the shape to be formed, and shape memory means for storing a shape formed by each of the plot operations, searching means for, when a portion to be changed such as a scale is specified, referring to stored contents in said information memory means to search changing information required for changing, shape display processing means and scale display processing means such as a graphic processor for processing and displaying a shape and a scale on said display means, respectively;

wherein said shape operating means is activated in accordance with changing information of said searching means to change the shape or scale;

wherein said information memory means further includes history memory means for storing history information including a plot method or plot contents of each of plot operations executed when the shape is input and formed, and an order of the plot operations;

wherein said searching means performs, when scale adding for defining a scale relation as a dependency between a plurality of plot operations not having a dependency therebetween is to be performed, searching a dependency present between the plot operations corresponding to the scale to be added, and correcting the dependency as the changing information into a scale relation corresponding to the scale to be added;

wherein the changing information is obtained by calculating a moving procedure in which, assuming that a plot operation executed first in an order of a plurality of plot operations to which the scale is to be added is a first reference plot operation, predetermined conditions for arranging plot operations executed from a second plot operation at predetermined positions with respect to the first reference plot operation are satisfied; and wherein the moving procedure is calculated by scale value calculating means such as an arithmetic processor for searching plot operations having dependencies with respect to the plot operations executed from the second plot operation, setting a plot operation executed earliest of the plot operations having dependencies as a second reference plot operation, and calculating a scale relation satisfying the predetermined conditions on the basis of a preliminary scale relation obtained by preliminarily calculating a scale relation for the second reference plot operation, and said shape modeling apparatus executes again in the second reference plot operations and all of the plot operations having the dependencies so as to satisfy the scale relation.

4. A shape modeling apparatus comprising:

inputting means for inputting an input command or input data for forming a two- or three-dimensional shape or changing the formed shape;

command analyzing means for syntactic-analyzing the input command or the input data;

processing means for executing a plot operation of the basis of the input command and the input data, thereby forming a shape or changing the formed shape or scale to obtain a new shape;

display means for displaying the shape formed by said processing means, wherein said processing means comprises:

shape operating means capable of executing a plot operation for forming or changing the shape and executing a reverse operation of the plot operation if necessary, information memory means having geometric constraint propagating means including control programs for performing plot processing by referring to geometric constraint data for storing the plot operations executed upon formation of the shape and geometric constraints for defining the shape to be formed, and shape memory means for storing a shape formed by each of the plot operations, searching means for, when a portion to be changed such as a scale is specified, referring to stored contents in said information memory means to search changing information required for changing, shape display processing means and scale display processing means such as a graphic processor for processing and displaying a shape and a scale on said display means, respectively;

wherein said shape operating means is activated in accordance with changing information of said searching means to change the shape or scale;

wherein said information memory means further includes history memory means for storing history information including a plot method or plot contents of each of plot operations executed when the shape is input and formed, and an order of the plot operations;

wherein said searching means performs, when scale adding for defining a scale relation as a dependency between a plurality of plot operations not having a dependency therebetween to be performed, searching a dependency present between the plot operations corresponding to the scale to be added, and correcting the dependency as the changing information not a scale relation corresponding to the scale to be added; and further comprising shape changing method planning means including control programs for, upon execution of said scale adding step, checking whether reverse operations of plot operations are to be executed in a reverse order by referring to the predetermined stored information to a completion state of an immediately preceding plot operation of a plot operation executed earliest in an order of a plurality of plot operations for which said scale adding step is to be executed, thereby sequentially cancelling the plot operations backward, or the plot operations are to be retried from the beginning by referring to the predetermined stored information to a completion state of an immediately preceding plot operation of the plot operation executed earliest.

5. A shape modeling apparatus comprising:

inputting means for inputting an input command or input data for forming a two- or three-dimensional shape or changing the formed shape;

command analyzing means for syntactic-analyzing the input command or the input data;

processing means for executing a plot operation on the basis of the input command and the input data, thereby forming a shape or changing the formed shape or scale to obtain a new shape;

display means for displaying the shape formed by said processing means, wherein said processing means comprises:

shape operating means capable of executing a plot operation for forming or changing the shape and executing a reverse operation of the plot operation if necessary, information memory means having geometric constraint propagating means including control programs for performing plot processing by referring to geometric constraint data for storing the plot operations executed upon formation of the shape and geometric constraints for defining the shape to be formed, and shape memory means for storing a shape formed by each of the plot operations, searching means for, when a portion to be changed such as a scale is specified, referring to stored contents in said information memory means to search changing information required for changing, shape display processing means and scale display processing means such as a graphic processor for processing and displaying a shape and a scale on said display means, respectively;

wherein said shape operating means is activated in accordance with the changing information of said searching means to change the shape or scale;

wherein said information memory means further includes history memory means for storing history information including a plot method or plot contents of each of plot operations executed when the shape is input and formed, and an order of the plot operations;

wherein said searching means performs, when scale adding for defining a scale relation as a dependency between a plurality of plot operations not having a dependency therebetween is to be performed, searching a dependency present between the plot operations corresponding to the scale to be added, and correcting the dependency as the changing information into a scale relation corresponding to the scale to be added;

shape changing method planning means including control programs for, upon execution of said scale adding step, checking whether reverse operations of plot operations are to be executed in a reverse order by referring to the predetermined stored information to a completion state of an immediately preceding plot operation a plot operation executed earliest in an order of a plurality of plot operations for which said scale adding step is to be executed, thereby sequentially cancelling the plot operations backward, or the plot operations are to be retried from the beginning by referring to the predetermined stored information to a completion state of an immediately preceding plot operation of the plot operation executed earliest; and wherein after said scale adding step is executed, the shape is reconstructed in accordance with information of said history memory means storing a plot method or plot contents of each of plot operations executed upon formation of the shape, and an order of the plot operations.

6. A shape modeling apparatus comprising:

inputting means for inputting an input command or input data for forming a two- or three-dimensional shape or changing the formed shape;

command analyzing means for syntactic-analyzing the input command or the input data;

processing means for executing a plot operation on the basis of the input command and the input data, thereby forming a shape or changing the formed shape or scale to obtain a new shape; and display means for displaying the shape formed by said processing means, wherein said processing means comprises:

shape operating means capable of executing a plot operation for forming or changing the shape and executing a reverse operation of the plot operation if necessary, information memory means having geometric constraint propagating means including control programs for performing plot processing by referring to geometric constraint data for storing the plot operations executed upon formation of the shape and geometric constraints for defining the shape to be formed, and shape memory means for storing a shape formed by each of the plot operations, searching means for, when a portion to be changed such as a scale is specified, referring to stored contents in said information memory means to search changing information required for changing, shape display processing means and scale display processing means such as a graphic processor for processing and displaying a shape and a scale on said display means, respectively;

wherein said shape operating means is activated in accordance with changing information of said searching means to change the shape or scale;

wherein said information memory means further includes history memory means for storing history information including a plot method or plot contents of each of plot operations executed when the shape is input and formed, and an order of the plot operations;

wherein said searching means performs, when scale adding for defining a scale relation as a dependency between a plurality of plot operations not having a dependency therebetween is to be performed, searching a dependency present between the plot operations corresponding to the scale to be added, and correcting the dependency as the changing information onto a scale relation corresponding to the scale to be added;

wherein the changing information is obtained by calculating a moving procedure in which, assuming that a plot operation executed first in an order of a plurality of plot operations to which the scale is to be added is a first reference plot operation, predetermined conditions for arranging plot operations executed from a second plot operation at predetermined positions with respect to the first reference plot operation are satisfied;

wherein the moving procedure is calculated by scale value calculating means such as an arithmetic processor for searching plot operations having dependencies with respect to the plot operations executed from the second plot operation, setting a plot operation executed earliest of the plot operations having dependencies as a second reference plot operation, and calculating a scale relation satisfying the predetermined conditions on the basis of a preliminary scale relation obtained by preliminarily calculating a scale relation for the second reference plot operation, and said shape modeling apparatus executes again the second reference plot operation and all the plot operations having the dependencies so as to satisfy the scale relation;

shape changing method planning means including control programs for, upon execution of said scale adding step, checking whether reverse operations of plot operations are to be executed in a reverse order by referring to the predetermined stored information to a completion state of an immediately preceding plot operation of a plot operation executed earliest in an order of a plurality of plot operations for which said scale adding step is to be executed, thereby sequentially cancelling the plot operations backward, or the plot operations are to be retried from the beginning by referring to the predetermined stored information to a completion state of an immediately preceding plot operation of the plot operation executed earliest; and wherein after said scale adding step is executed, the shape is reconstructed in accordance with information of said history memory means storing a plot method or plot contents of each of plot operations executed upon formation of the shape, and an order of the plot operations.

* * * * *